United States Patent
Tran et al.

(10) Patent No.: US 8,720,044 B1
(45) Date of Patent: May 13, 2014

(54) METHOD FOR MANUFACTURING A MAGNETIC RECORDING TRANSDUCER HAVING SIDE SHIELDS

(71) Applicant: Western Digital (Fremont), LLC, Fremont, CA (US)

(72) Inventors: Ut Tran, San Jose, CA (US); Zhigang Bai, Milpitas, CA (US); Kevin K. Lin, San Ramon, CA (US); Li He, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/778,464

(22) Filed: Feb. 27, 2013

Related U.S. Application Data

(62) Division of application No. 12/239,321, filed on Sep. 26, 2008, now abandoned.

(51) Int. Cl.
*G11B 5/127* (2006.01)
*H04R 31/00* (2006.01)
*G11B 5/31* (2006.01)
*G11B 5/11* (2006.01)

(52) U.S. Cl.
CPC . *G11B 5/315* (2013.01); *G11B 5/11* (2013.01); *G11B 5/127* (2013.01); *G11B 5/3116* (2013.01); *G11B 5/3163* (2013.01)
USPC ............. 29/603.14; 29/603.11; 29/603.12; 29/603.13; 29/603.16; 29/603.18; 360/121; 360/122; 360/317

(58) Field of Classification Search
CPC .......... G11B 5/11; G11B 5/127; G11B 5/315; G11B 5/3163
USPC ............ 29/603.11, 603.13–603.16, 603.18; 360/121, 123, 125.09, 317
See application file for complete search history.

(56) References Cited

U.S. PATENT DOCUMENTS

| | | |
|---|---|---|
| 6,497,825 B1 | 12/2002 | Kamijima |
| 6,943,993 B2 | 9/2005 | Chang et al. |
| 6,949,833 B2 | 9/2005 | O'Kane et al. |
| 6,954,340 B2 | 10/2005 | Shukh et al. |
| 6,975,486 B2 | 12/2005 | Chen et al. |
| 6,980,403 B2 | 12/2005 | Hasegawa |

(Continued)

OTHER PUBLICATIONS

Mallary et al., "One Terabit per Square Inch Perpendicular Recording Conceptual Design", IEEE Transactions on Magnetics, vol. 38, No. 4, pp. 1719-1724, Jul. 2002.

(Continued)

*Primary Examiner* — Paul D Kim

(57) ABSTRACT

A method for manufacturing a magnetic transducer is described. The method includes providing a negative mask having a bottom, a plurality of sides, and a top wider than the bottom. The method also includes depositing a nonmagnetic layer on the negative mask. The nonmagnetic layer has a plurality of portions covering the plurality of sides of the negative mask. The method also includes providing a first mask having a first trench therein. The negative mask resides in the first trench. The method further includes depositing side shield material(s), at least a portion of which resides in the first trench. The method further includes removing the negative mask to create a second trench between the plurality of portions of the nonmagnetic layer and form a pole, at least a portion of which resides in the second trench.

16 Claims, 14 Drawing Sheets

(56) References Cited

U.S. PATENT DOCUMENTS

| | | |
|---|---|---|
| 7,002,775 B2 | 2/2006 | Hsu et al. |
| 7,024,756 B2 | 4/2006 | Le et al. |
| 7,042,682 B2 | 5/2006 | Hu et al. |
| 7,067,066 B2 | 6/2006 | Sasaki et al. |
| 7,070,698 B2 | 7/2006 | Le |
| 7,075,756 B1 | 7/2006 | Mallary et al. |
| 7,124,498 B2 | 10/2006 | Sato |
| 7,193,815 B1 | 3/2007 | Stoev et al. |
| 7,239,479 B2 | 7/2007 | Sasaki et al. |
| 7,295,401 B2 | 11/2007 | Jayasekara et al. |
| 7,296,339 B1 | 11/2007 | Yang et al. |
| 7,322,095 B2 | 1/2008 | Guan et al. |
| 7,337,530 B1 | 3/2008 | Stoev et al. |
| 7,444,740 B1 | 11/2008 | Chung et al. |
| 7,508,627 B1 | 3/2009 | Zhang et al. |
| 7,551,396 B2 | 6/2009 | Hsu et al. |
| 7,558,019 B2 | 7/2009 | Le et al. |
| 7,587,811 B2 | 9/2009 | Balamane et al. |
| 7,712,206 B2 | 5/2010 | Jiang et al. |
| 7,804,666 B2 | 9/2010 | Guan et al. |
| 7,894,159 B2 | 2/2011 | Lengsfield, III et al. |
| 7,920,358 B2 | 4/2011 | Jiang et al. |
| 8,000,064 B2 | 8/2011 | Kawano et al. |
| 8,015,692 B1 | 9/2011 | Zhang et al. |
| 8,035,930 B2 | 10/2011 | Takano et al. |
| 8,049,989 B2 | 11/2011 | Jiang et al. |
| 8,139,320 B2 | 3/2012 | Hsiao et al. |
| 8,164,853 B2 | 4/2012 | Hirata et al. |
| 8,166,631 B1 | 5/2012 | Tran et al. |
| 8,231,796 B1 | 7/2012 | Li et al. |
| 8,276,258 B1 | 10/2012 | Tran et al. |
| 8,300,359 B2 | 10/2012 | Hirata et al. |
| 8,488,272 B1 | 7/2013 | Tran et al. |
| 8,563,146 B1 * | 10/2013 | Zhang et al. .......... 428/800 |
| 8,576,517 B1 | 11/2013 | Tran et al. |
| 8,578,594 B2 * | 11/2013 | Jiang et al. .......... 29/603.16 |
| 2002/0071208 A1 | 6/2002 | Batra et al. |
| 2004/0032692 A1 | 2/2004 | Kobayashi |
| 2004/0156148 A1 | 8/2004 | Chang et al. |
| 2005/0057852 A1 | 3/2005 | Yazawa et al. |
| 2005/0068669 A1 | 3/2005 | Hsu et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0098334 A1 | 5/2006 | Jayasekara et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0245545 A1 | 10/2007 | Pentek et al. |
| 2007/0247749 A1 | 10/2007 | Bonhote et al. |
| 2007/0253107 A1 | 11/2007 | Mochizuki et al. |
| 2007/0258167 A1 | 11/2007 | Allen et al. |
| 2007/0263324 A1 | 11/2007 | Allen et al. |
| 2007/0268626 A1 | 11/2007 | Taguchi et al. |
| 2007/0268627 A1 | 11/2007 | Le et al. |
| 2008/0113090 A1 | 5/2008 | Lam et al. |
| 2008/0113514 A1 | 5/2008 | Baer et al. |
| 2008/0253035 A1 | 10/2008 | Han et al. |
| 2008/0297945 A1 | 12/2008 | Han et al. |
| 2009/0002885 A1 | 1/2009 | Sin |
| 2009/0109570 A1 | 4/2009 | Scholz et al. |
| 2009/0147410 A1 | 6/2009 | Jiang et al. |
| 2009/0168236 A1 | 7/2009 | Jiang et al. |
| 2010/0061016 A1 | 3/2010 | Han et al. |
| 2011/0304939 A1 | 12/2011 | Hirata et al. |

OTHER PUBLICATIONS

Office Action dated Nov. 8, 2011 from U.S. Appl. No. 12/239,321, 10 pages.
Office Action dated Apr. 12, 2012 from U.S. Appl. No. 12/239,321, 11 pages.
Notice of Allowance dated Jul. 9, 2012 from U.S. Appl. No. 12/239,321, 13 pages.
Office Action dated Sep. 7, 2012 from U.S. Appl. No. 12/239,321, 14 pages.
Notice of Allowance dated Dec. 17, 2012 from U.S. Appl. No. 12/239,321, 9 pages.
Office Action dated May 8, 2013 from U.S. Appl. No. 12/239,321, 8 pages.

* cited by examiner

METHOD FOR MANUFACTURING A MAGNETIC RECORDING TRANSDUCER HAVING SIDE SHIELDS

CROSS REFERENCE TO RELATED APPLICATIONS

This application is a divisional of U.S. patent application Ser. No. 12/239,321, filed on Sep. 26, 2008, now pending, which is hereby incorporated by reference in its entirety.

BACKGROUND

Side shields, as well as top shields, may be desired in conventional magnetic recording transducers, particular perpendicular magnetic recording (PMR) transducers. Side shields in combination with top shields that surround the sides and top of the main PMR pole are termed wrap-around shields. Various conventional methods are available to fabricate wrap-around shields. For example, some conventional methods deposit a magnetic layer and trim the layer to form a conventional PMR pole. Once the conventional PMR pole is formed, nonmagnetic layer(s), as well as shields, are provided around the conventional pole. Although this method functions at lower recording densities, at higher recording densities issues arise. Higher recording densities correspond to lower track widths of the conventional PMR pole. In addition, a conventional PMR pole has a reverse angle. Stated differently, the top of the conventional PMR pole is wider than the bottom. Consequently, at higher densities, the width of the conventional PMR pole may be sufficiently small that the conventional PMR pole collapses. This may adversely affect yield and performance.

Another conventional method uses an aluminum oxide reactive ion etch (RIE) to form a trench in an aluminum oxide layer. The pole is plated in the trench. Portions of the aluminum oxide might then be removed and replaced with shield material. Thus, a wrap around shield may be formed. However, control of removal of the aluminum oxide to provide the desired profile for the wrap-around shield may be problematic. Consequently, a PMR transducer having the desired properties may be difficult to achieve.

Accordingly, what is needed is a system and method for improving the fabrication of a magnetic recording head having side shields.

BRIEF SUMMARY OF THE INVENTION

A method and system for providing a magnetic transducer are described. In one aspect, the method and system include providing a negative mask having a bottom, a plurality of sides, and a top wider than the bottom. The method and system also include providing a nonmagnetic layer on the negative mask. The nonmagnetic layer has a plurality of portions covering the plurality of sides of the negative mask. The method and system also include providing a first mask having a first trench therein. The negative mask resides in the first trench. The method and system further include providing side shield material(s), at least a portion of which resides in the first trench. The method and system further include removing the negative mask to provide a second trench between portions of the nonmagnetic layer. The method and system also include providing a pole, at least a portion of which resides in the second trench. In another aspect, the method and system include providing a main pole having a bottom, a plurality of sides, and a top wider than the bottom. In this aspect, the method and system also include providing a nonmagnetic layer and providing side shield material(s). At least a portion of the nonmagnetic layer covers the sides of the main pole and resides between the side shield material(s) and the main pole. The method and system also include removing a top portion of the side shield material(s), providing a nonmagnetic material on a remaining portion of the side shield material(s), and providing a top shield. The nonmagnetic material physically separates the remaining portion of the at least one side shield material from the top shield. In a third aspect, the method and system include providing a main pole having a bottom, a plurality of sides, and a top wider than the bottom. In this aspect, the method and system also include providing a nonmagnetic layer and providing side shield material(s) including a top and at least one edge. At least a portion of the nonmagnetic layer covers the sides of the main pole and resides between the side shield material(s) and the main pole. The method and system also include removing a portion of the top of the side shield material(s) distal from the edge(s) and providing a nonmagnetic material on a remaining portion of the side shield material(s). Thus, the edge(s) of the side shield material(s) are exposed. The method and system further include providing a top shield on the nonmagnetic material. The edge(s) of the side shield material(s) contact the top shield.

DETAILED DESCRIPTION OF THE PREFERRED EMBODIMENTS

Figure 1:
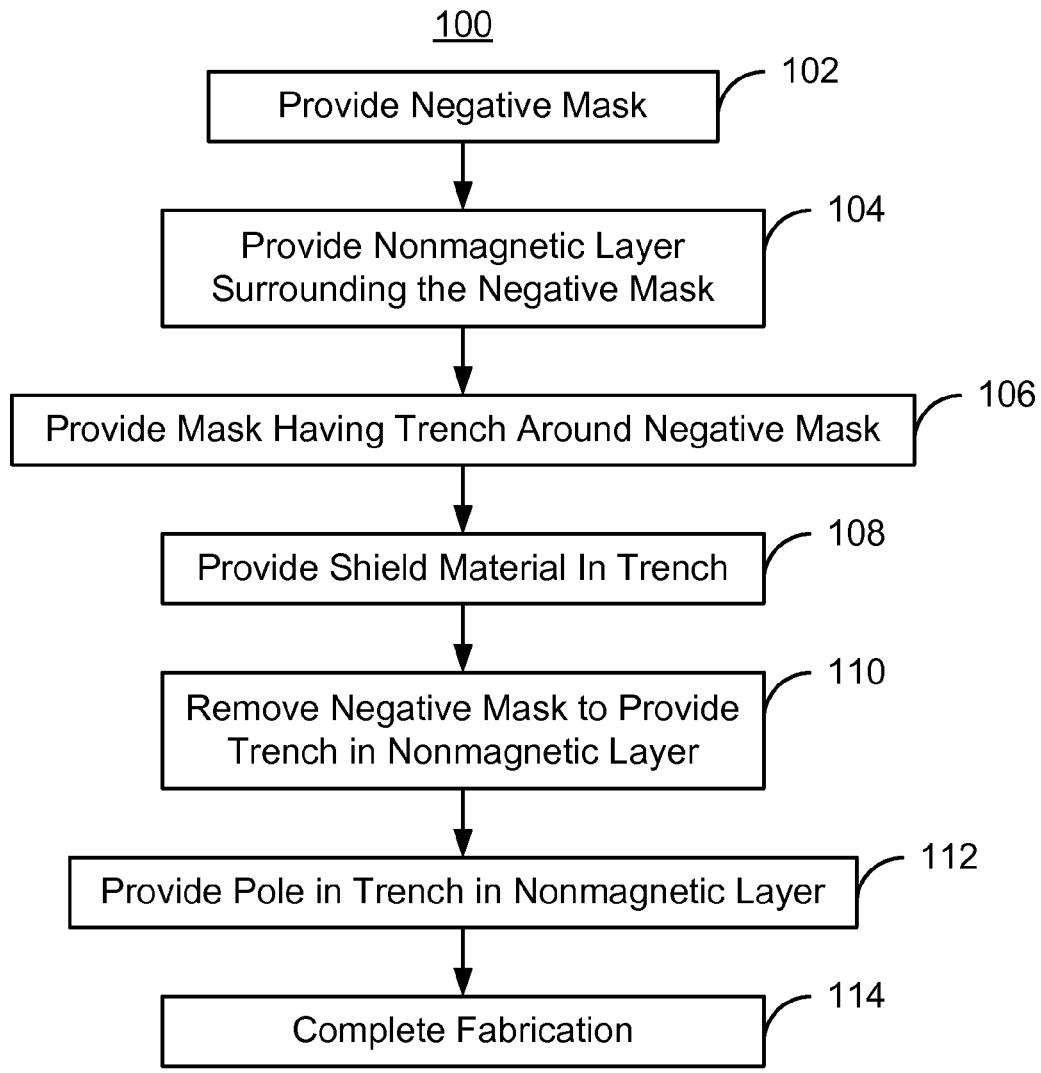
FIG. 1 is a flow chart depicting an exemplary embodiment of a method for fabricating a magnetic recording transducer.

FIG. 1 is a flow chart depicting an exemplary embodiment of a method 100 for fabricating a magnetic recording transducer having side shields. For simplicity, some steps may be omitted or combined. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 commences after formation of an underlayer. The underlayer is nonmagnetic may be an insulator, such as aluminum oxide. Further, a leading shield may have been formed below the underlayer.

A negative mask is provided, via step 102. The negative mask has a profile that corresponds to the desired profile of the final pole. Thus, the negative mask has a bottom, a plurality of sides, and a top that is wider than bottom. In one embodiment, step 102 is performed by providing a trench in a sacrificial mask, such as a photoresist mask and depositing a sacrificial material in the trench. The sacrificial mask would then be removed to provide the negative mask.

A nonmagnetic layer is provided on the negative mask, via step 104. In one embodiment, step 104 includes providing an aluminum oxide layer through atomic layer deposition (ALD). In another embodiment, other materials such as other oxides, nitrides and metals such as Ru may be used. In one embodiment, the thickness of the nonmagnetic layer is approximately one-third the thickness of the side gap. However, in another embodiment, the nonmagnetic layer may have another thickness. The nonmagnetic layer covers the sides of the negative mask. In one embodiment, the nonmagnetic layer is also provided on the underlayer. A first mask having a first trench therein is provided, via step 106. The negative mask resides in the first trench. Stated differently, the first mask is provided around the existing negative mask. In one embodiment, step 106 includes providing a photoresist layer and forming the first trench in the photoresist layer.

Side shield material(s) are provided, via step 108. At least a portion of the side shield material(s) resides in the first trench. In one embodiment, step 108 includes plating soft magnetic materials, such as NiFe and/or CoNiFe. The negative mask is then removed, via step 110. In one embodiment, step 110 includes removing a portion of the nonmagnetic layer that covers the top of the negative mask. A portion of the nonmagnetic layer that covers the sides of the negative mask may also be removed. As a result, a second trench is provided between the portions of the nonmagnetic layer that covered the sides of the negative mask. In addition, the side shield material(s) that surrounded the sides of the nonmagnetic layer (and negative mask) remain.

A pole is provided, via step 112. At least a portion of the pole resides in the second trench. In one embodiment, step 112 includes providing one or more nonmagnetic layers in the second trench. The nonmagnetic layers may be used to further adjust the track width, as planarization stop layer(s), and/or as seed layer(s). Step 112 may also include providing a magnetic material for the pole and planarizing the magnetic transducer, for example using a chemical mechanical planarization (CMP). Step 112 may also include forming bottom and/or top bevels in the pole. These bevels may be formed in a number of ways, some of which are described below with respect to FIGS. 18-28. For example, a bottom bevel may be formed by removing a portion of the underlayer distal to the final location of the air-bearing surface (ABS location) and refilling with a magnetic material. The remainder of the pole may then be provided on the refilled magnetic material. If the magnetic material is refilled above the top surface of the underlayer, then a top bevel may also be formed. In another embodiment, the deposition of the nonmagnetic material(s) may continue such that the nonmagnetic layer grows together to fill the bottom of a thinner portion of the second trench in proximity to the ABS location. The bottom of a yoke portion of the second trench distal from the ABS location is not completely filled. Thus, the profile for the bottom bevel is naturally formed. A top bevel may be formed by removing a portion of the magnetic material for the pole proximate to the ABS location.

Once the pole is provided in step 112, fabrication of the magnetic transducer may be completed, via step 114. For example, a write gap and top shield may be provided. The write gap would cover the pole. If the top shield is desired to float, then in one embodiment, a portion of the write gap and/or other materials may separate the top shield from the side shield material(s). However, in another embodiment, the write gap may not separate the top shield from the side shield material(s).

Figure 2:
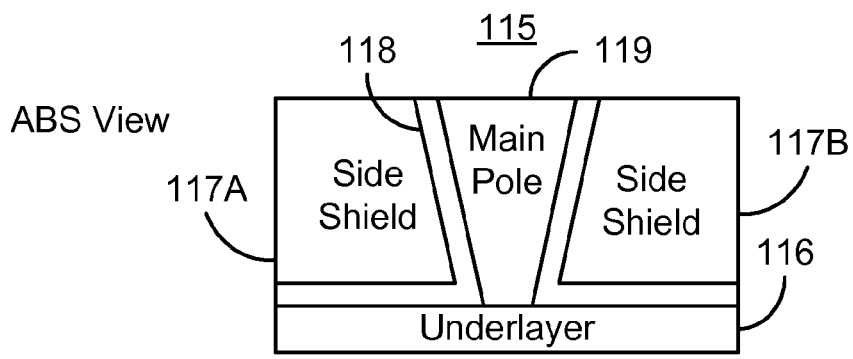
FIG. 2 is a diagram depicting an exemplary embodiment of a magnetic recording transducer.

FIG. 2 is a diagram depicting an exemplary embodiment of a magnetic transducer 115 formed using the method 100 after step 112 is completed. The transducer 115 may be part of a magnetic recording head that may also include a read transducer (not shown) and resides on the slider for a disk drive. The magnetic transducer 115 includes an underlayer 116 and side shields 117A and 117B, nonmagnetic layer 118 and pole 119. The nonmagnetic layer 118 includes at least the nonmagnetic layer formed on the sides of the negative mask and any additional nonmagnetic materials provided in step 112. The side shields 117A and 117B are formed from the side shield material(s) provided in step 108.

Thus, side shields 117A and 117B are formed. Consequently, stray side fields may be reduced. Further, because the main pole 119 is formed from the negative mask, the main pole 119 need not be trimmed. The main pole 119 may be less likely to collapse during formation. Thus, main pole 119 having a lower track width may be provided. Further, if the nonmagnetic material 118 includes nonmagnetic material deposited in the second trench in step 112, the width of the main pole 119 may be further reduced. In addition, the main pole 119 may be provided without removal of aluminum oxide around the pole. Consequently, the profile of the side shields 117A and 117B may be better controlled. Thus, the benefits of side shields 117A and 117B may be obtained at higher recording densities. In addition, the method 100 may be used with processes for forming beveled poles, described below. Examples of methods for providing a beveled pole are described below in connection with FIGS. 18-28. The advantages of a beveled pole, such as greater magnetic flux concentration may also be achieved.

Figure 3:
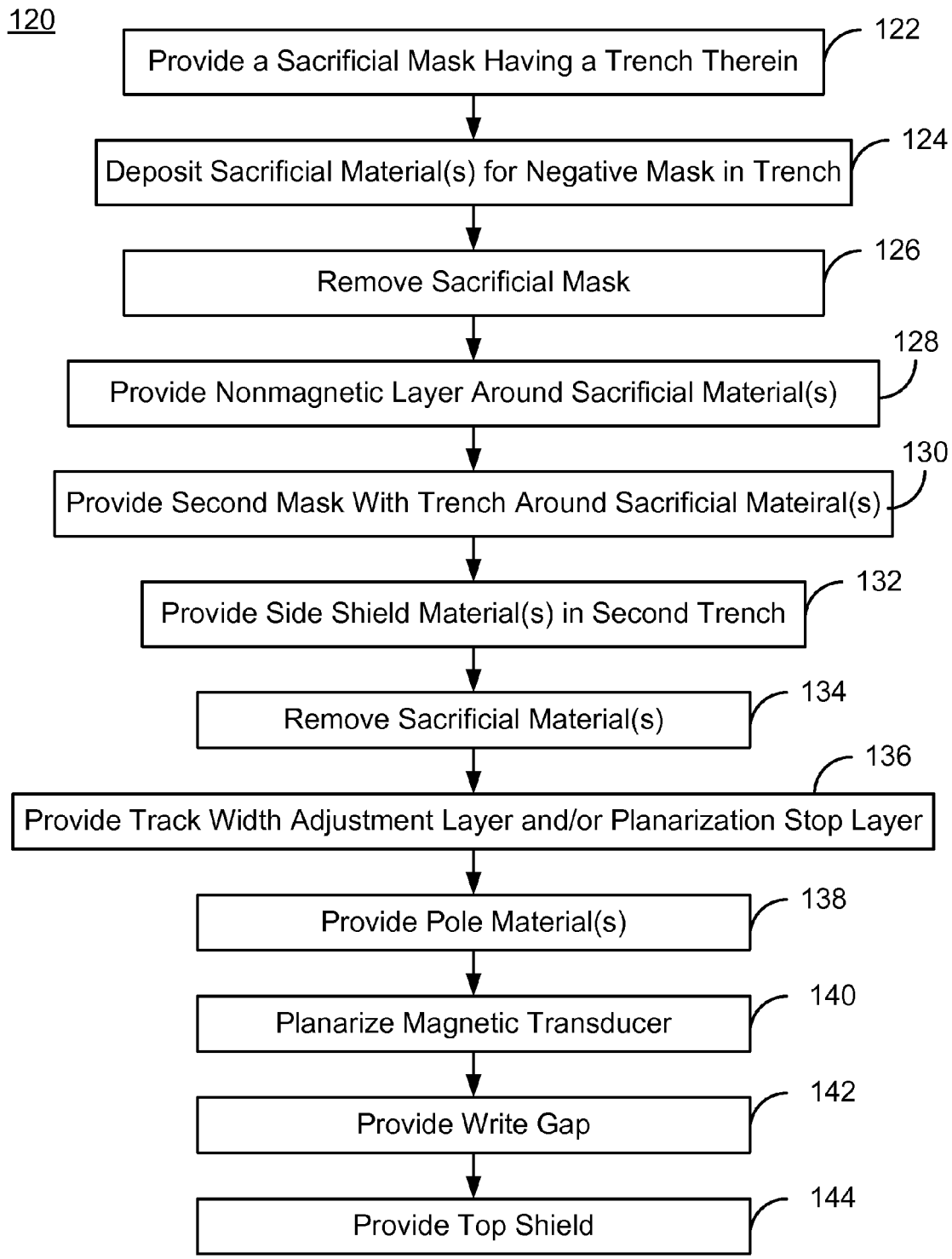
FIG. 3 is a flow chart depicting another exemplary embodiment of a method for fabricating a magnetic recording transducer.

FIG. 3 is a flow chart depicting another exemplary embodiment of a method 120 for fabricating a magnetic recording transducer. FIGS. 4-17 are diagrams depicting ABS views of an exemplary embodiment of a magnetic recording transducer 200 during fabrication. The transducer 200 may be part of a magnetic recording head that may also include a read transducer (not shown) and reside on the slider for a disk drive. The method 120 is described in the context of the magnetic recording transducer 200. Referring to FIGS. 3-17, in the method 120, some steps may be omitted or combined. The method 120 is also described in the context of providing a single recording transducer. However, the method 120 may be used to fabricate multiple transducers at substantially the same time. The method 120 and transducer 200 are also described in the context of particular layers. A particular layer may include multiple materials and/or multiple sublayers. The method 120 also may start after formation of other portions of the magnetic recording transducer. For example, the method 100 commences after formation of an underlayer. The underlayer is nonmagnetic may be an insulator, such as aluminum oxide. Further, a leading shield may have been formed below the underlayer. In addition, for clarity, FIGS. 4-17 are not drawn to scale.

Figure 4:
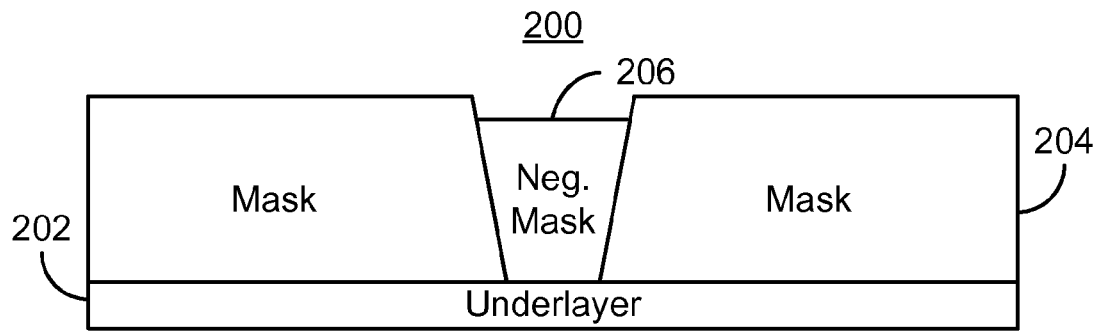
FIGS. 4-17 are diagrams depicting an exemplary embodiment of a magnetic recording transducer during fabrication.

A first, sacrificial mask is provided, via step 122. The first mask includes a trench therein. The trench has a profile corresponding to the pole to be provided. In one embodiment, step 122 includes providing a layer of photoresist, and developing the photoresist layer to provide the mask. Sacrificial material(s) are deposited in the trench, via step 124. In one embodiment, step 124 includes plating a magnetic material, such as NiFe. The sacrificial material(s) correspond to the negative mask. FIG. 4 depicts the magnetic transducer 200 after step 124 is performed. Consequently, the mask 204 and the underlayer 202 are depicted. In addition, the sacrificial material that forms a negative mask 206 is shown.

Figure 5:
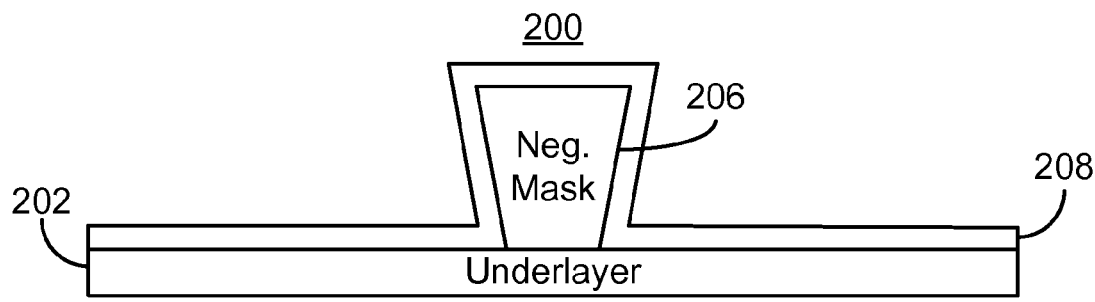

The first, sacrificial mask 204 is removed, via step 126. Step 126 includes stripping the photoresist mask 204. A nonmagnetic layer is provided, via step 128. In one embodiment, step 128 includes providing an aluminum oxide layer using ALD. However, in another embodiment, another technique and/or material(s) may be used. For example, in one embodiment, a trilayer including a planarization stop layer sandwiched between insulating layers may be provided in step 128. FIG. 5 depicts the magnetic transducer after step 128 is performed. Thus, a nonmagnetic layer 208 is depicted. The nonmagnetic layer 208 covers the plurality of sides of the negative mask 206.

Figure 6:
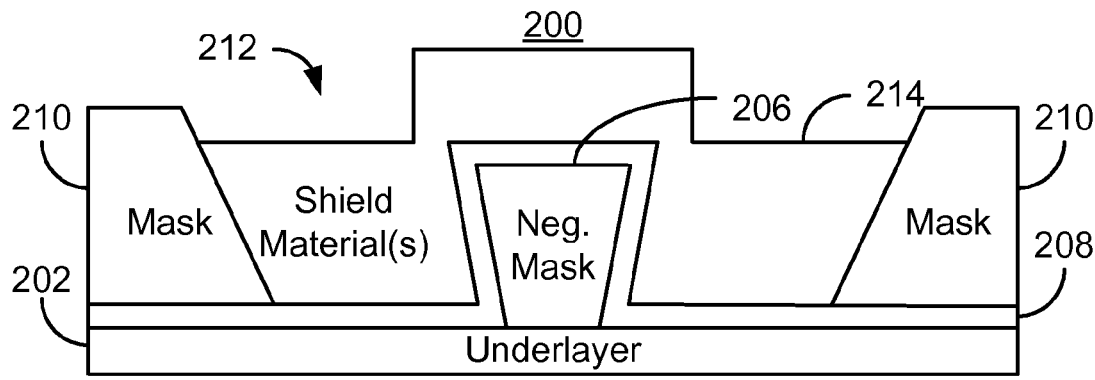

A second mask having a second trench therein is provided, via step 130. The mask may be provided in step 130 by providing a layer of photoresist and developing the photoresist to provide the second trench in the second mask. The mask is developed such that the negative mask 206 resides in the trench. The side shield material(s) are provided, via step 132. In one embodiment, step 132 includes plating the side shield material(s), for example NiFe and/or CoNiFe. FIG. 6 depicts the magnetic transducer after step 132 is performed. Thus, the mask 210 having a trench 212 therein is shown. In the embodiment shown, the top of the trench 212 is wider than the bottom. However, in another embodiment, the trench 212 may have another profile. As a result, the side shields being formed may have a different profile. Also shown are the side shield material(s) 214, at least which reside in the trench 212.

Figure 7:
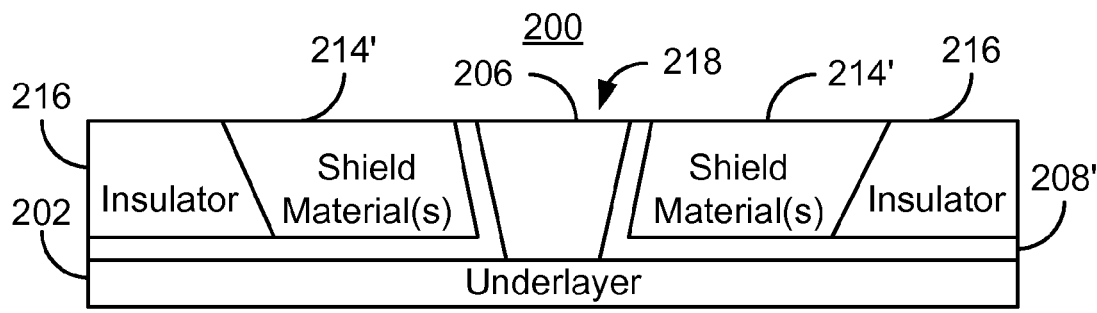
Figure 8:
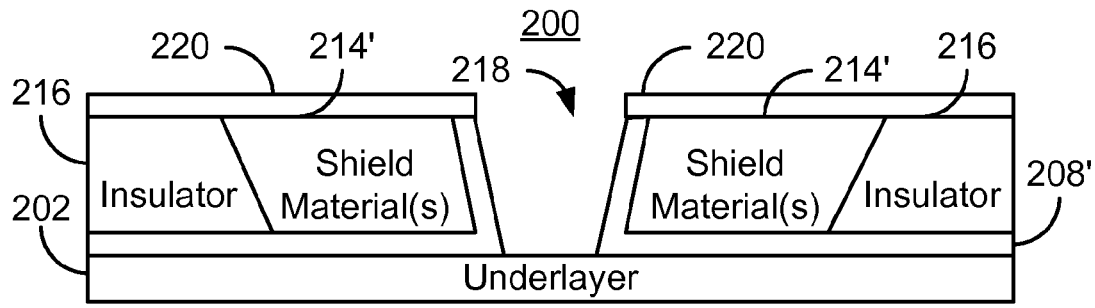

The sacrificial material(s) in the negative mask 206 are removed, via step 134. In one embodiment, step 134 includes stripping the mask 210, providing an insulator and performing a planarization, such as a CMP. In addition, a mask which exposes only the negative mask 206 may be provided and the negative mask 206 removed. For example, a wet etch may be performed. FIG. 7 depicts the magnetic transducer 200 after the mask 210 has been removed and replaced by insulator 216. In one embodiment, the insulator 216 includes aluminum oxide. In addition, a planarization has been performed. Consequently, side shield material(s) 214' remain. FIG. 8 depicts the magnetic transducer 200 after step 134 is completed. Thus, a mask 220 has been provided and the negative mask 206 removed. Thus, a trench 218 between the sides of the nonmagnetic layer 208' is formed.

Figure 9:
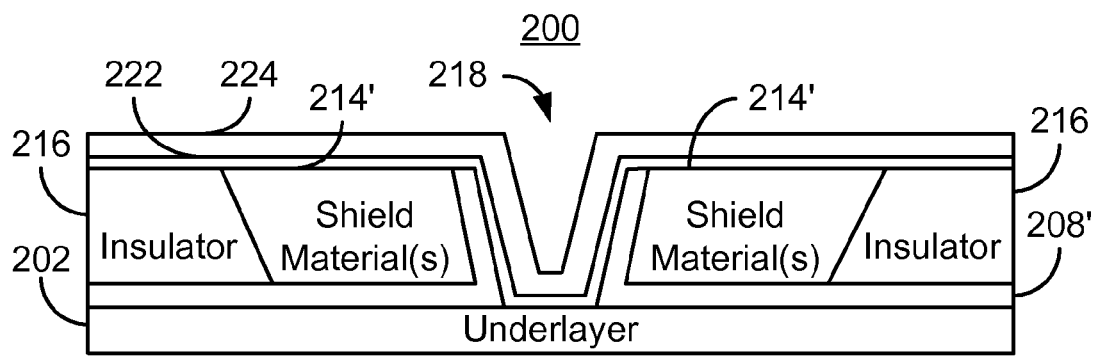

A main pole is provided using steps 136 through 140. Nonmagnetic material(s) are provided, via step 136. In one embodiment, step 136 includes optionally depositing a track width adjustment layer, at least a portion of which resides in the trench 218. This may include providing an additional aluminum oxide layer using ALD. However, another technique and/or material(s) may be used. In addition, a planarization stop layer may be provided in step 136. For example, a material such as Ru may be sputtered. FIG. 9 depicts the magnetic transducer after step 136 has been performed. Consequently, the mask 220 has been removed and layers 222 and 224 provided. The layer 222 is an optional track width adjustment layer. The layer 224 is a planarization stop layer.

Figure 10:
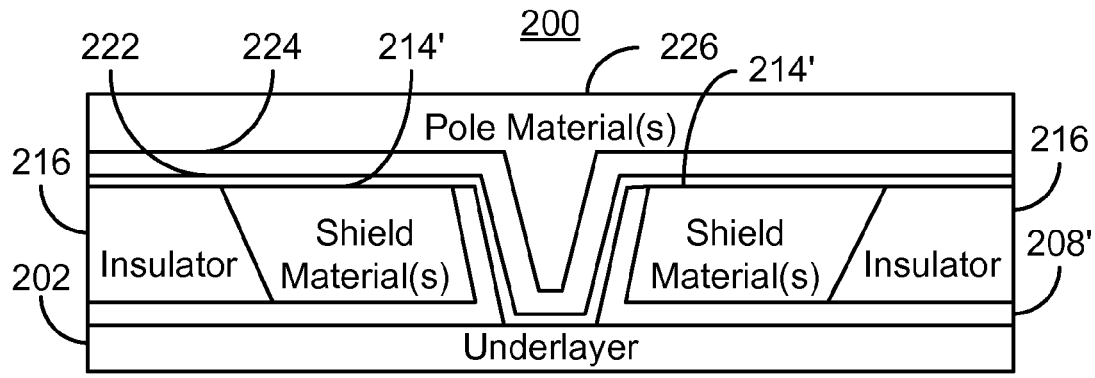
Figure 11:
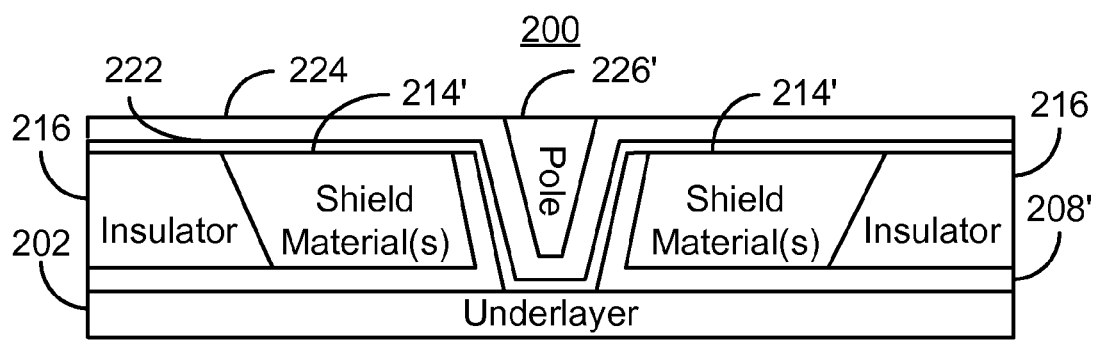

High magnetic moment pole material(s) are provided, via step 138. In one embodiment, step 138 includes plating the high moment material. FIG. 10 depicts step 138 is performed. Note that for clarity, the trench 218 is not denoted in FIGS. 10-17. Pole material(s) 226 are shown. At least a portion of the pole material(s) 226 resides in the trench 218. A planarization may then be performed on the magnetic transducer, via step 140. For example, a CMP may be performed. FIG. 11 depicts the magnetic transducer 200 after step 140 is performed. Because of the presence of the stop layer 224, the planarization terminates when a portion of the stop layer 224 remains and is uniform. Thus, the pole 226' is formed. In addition, as can be seen in FIG. 11, the bottom of the pole 226' may be at the same level as or higher than the bottom of the side shields formed by side shield material(s) 214'.

Figure 12:
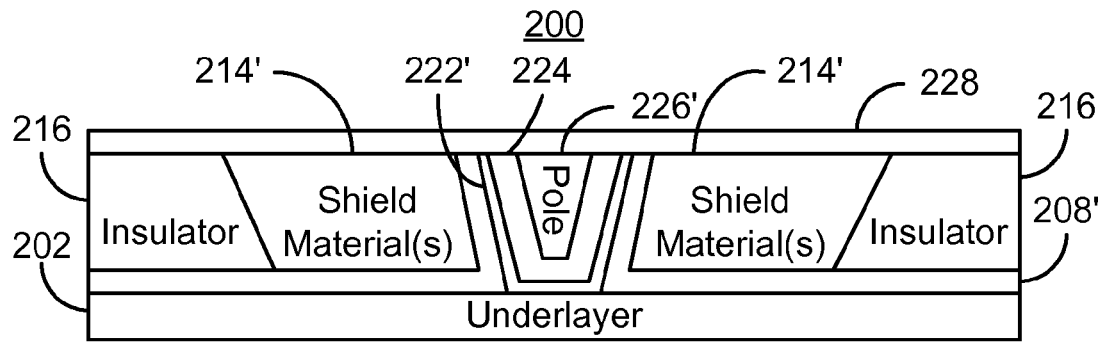

A write gap is provided, via step 142. The write gap covers at least the pole 226'. In one embodiment, step 142 includes removing the remaining planarization stop layer, for example via ion milling. The ion milling may also aid in adjusting the final track width for the pole 226'. A write gap layer may then be deposited. FIG. 12 depicts the magnetic transducer 200 after the write gap layer is deposited. Thus, a write gap layer 228 is shown and portions 222' and 224' of the layers 222 and 224 remain.

Figure 13:
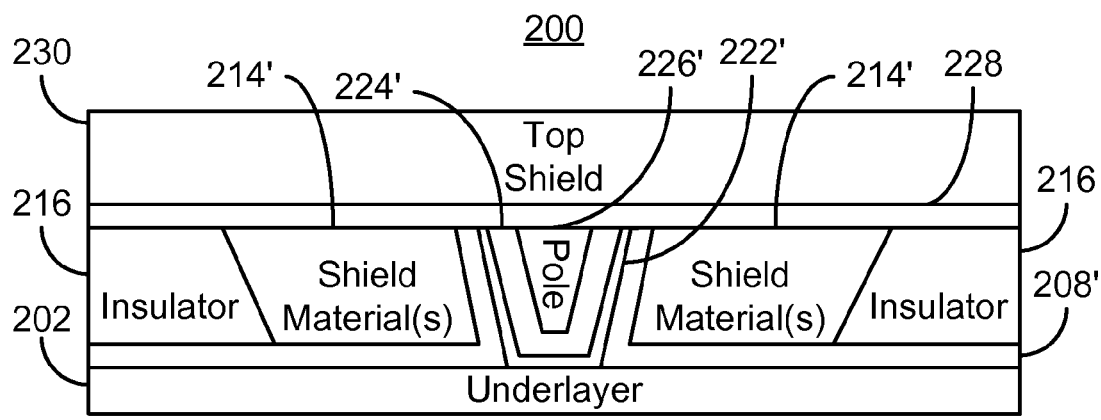
Figure 14:
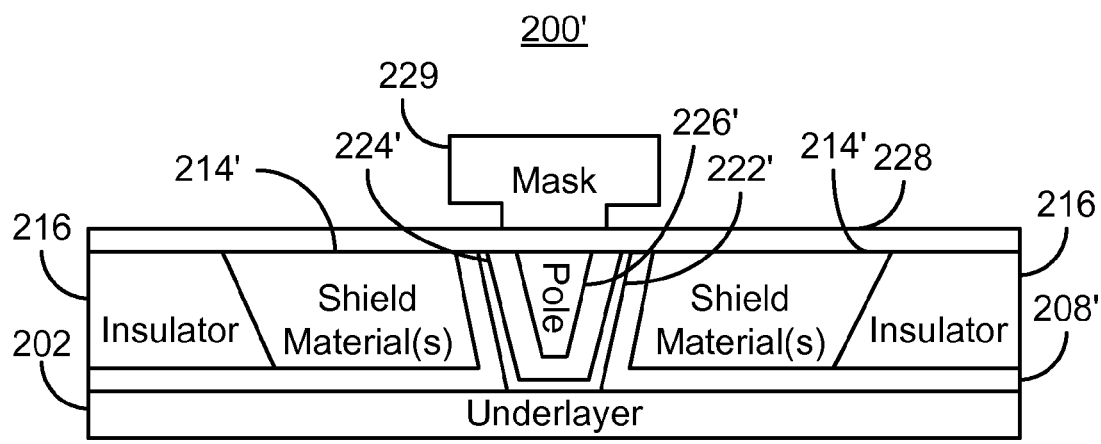
Figure 15:
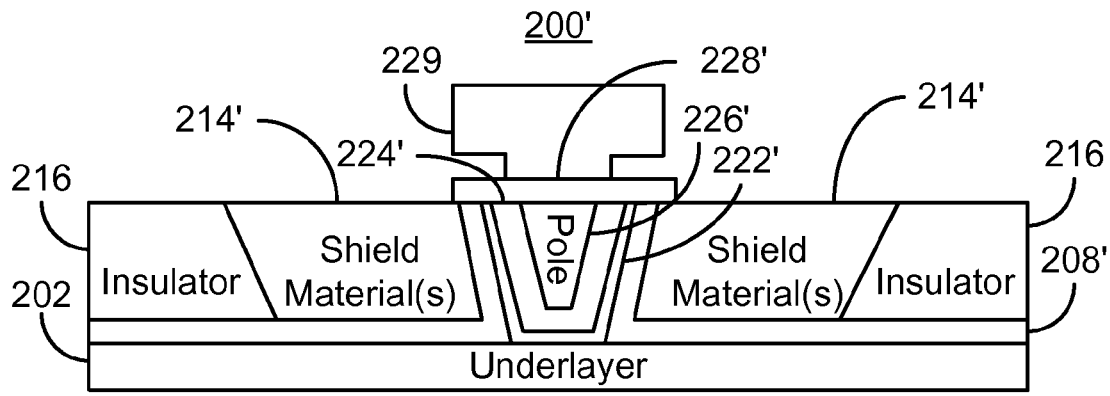
Figure 16:
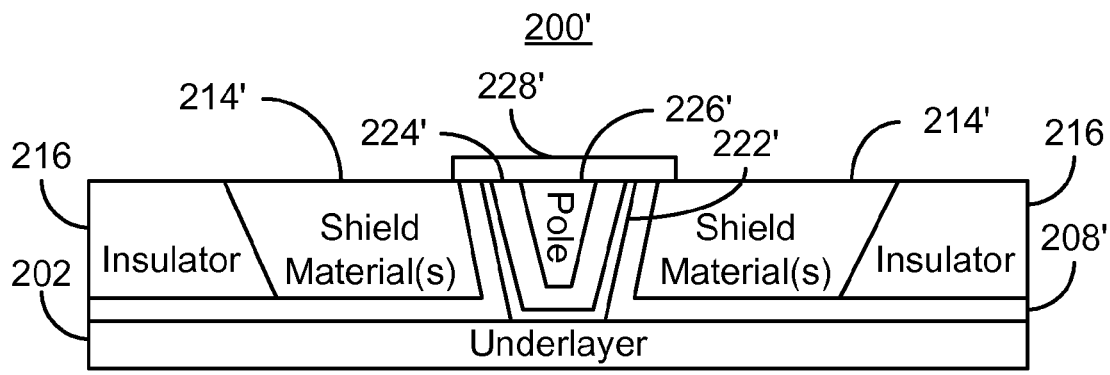
Figure 17:
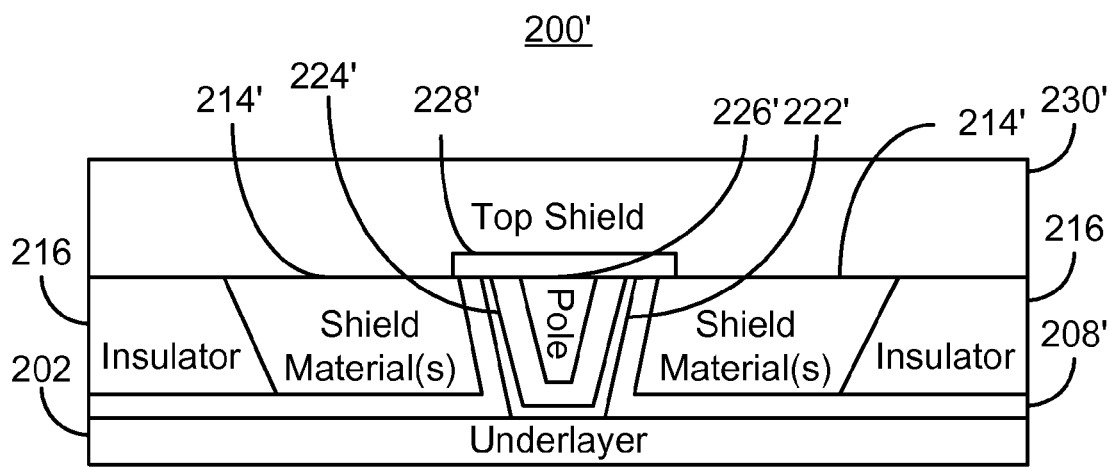

A top shield is provided, via step 144. At least a portion of the top shield resides on the write gap 228. In one embodiment, the top shield floats. Thus, the magnetic material(s) for the top shield may merely be deposited on the write gap layer 228. FIG. 13 depicts that magnetic transducer 200 after step 144 is performed in one such embodiment. Thus, a top shield 230 is shown. The write gap 228 physically separates the top shield 230 from the side shields 214'. In another embodiment, the top shield does not float. In such an embodiment, step 144 may include further processing of the write gap followed by deposition of top side shield material(s). For example, a portion of the write gap layer 228 is removed. The portion of the write gap layer 228 on the pole 226' may be masked, while the exposed write gap layer 228 is removed. FIG. 14 depicts a magnetic transducer 200' after such a mask has been provided. Thus, a mask 229 is shown on a portion of the write gap 228. FIG. 15 depicts the magnetic transducer 200' after a portion of the write gap layer 228 has been removed. Thus, the write gap 228' is formed. FIG. 16 depicts the magnetic transducer 200' after the mask 229 has been removed. FIG. 17 depicts the magnetic transducer after the top shield has been deposited. Thus, the top shield 230' is shown. A portion of the top shield 230' directly contacts a portion of the side shield 214'. Thus, the top shield 230 and side shields 214' may be considered to form a wrap-around shield. In addition, other processes may be performed after the pole is provided in step 140. Such processes are described below.

Thus, the magnetic transducers 200 and 200' share the benefits of the magnetic transducer 100. In particular, the method 120 provides a main pole 226' with a lower track width and a better controlled profile for the side shields 214'. Thus, stray side fields may be reduced or eliminated. In addition, the method 120 may also provide a pole 226' having bevels. Thus, better concentrated fields may be obtained. Examples of methods for providing a beveled pole are described below in connection with FIGS. 18-28.

Figure 18:
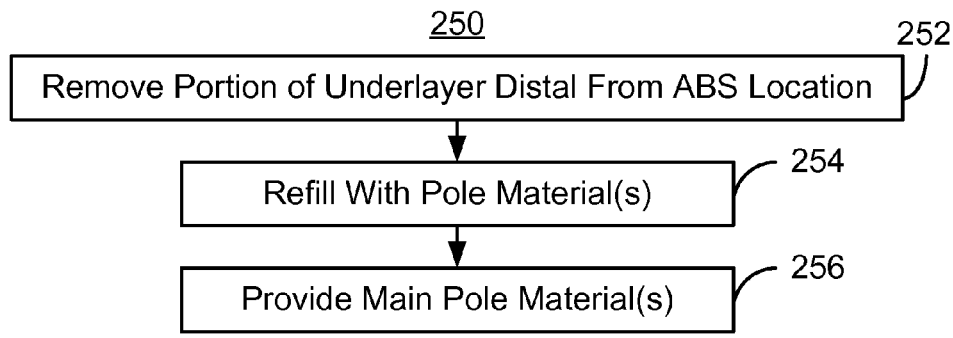
FIG. 18 is a flow chart depicting an exemplary embodiment of a method for fabricating a pole having a bevel in a magnetic recording transducer.
Figure 19:
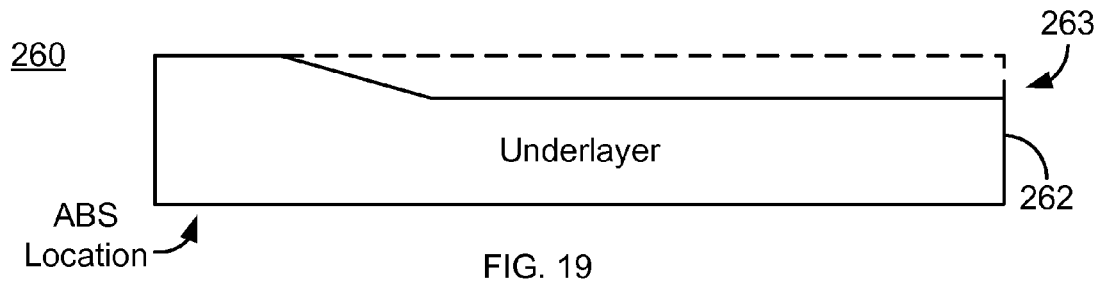
FIGS. 19-21 are diagrams depicting an exemplary embodiment of a magnetic recording transducer during fabrication.
Figure 20:
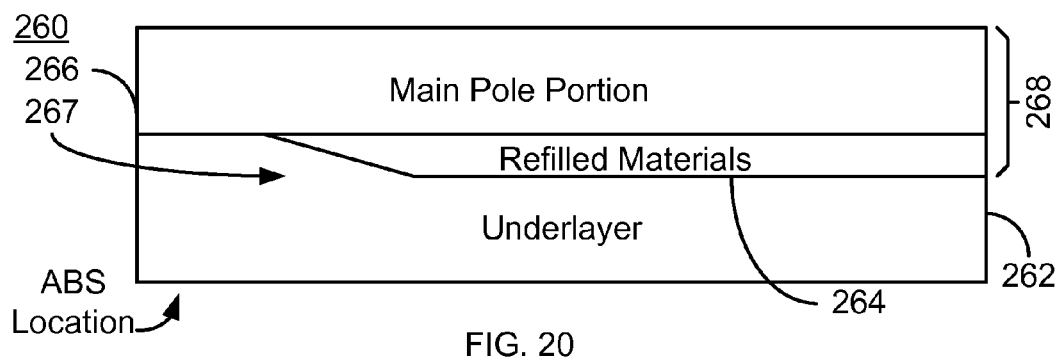
Figure 21:
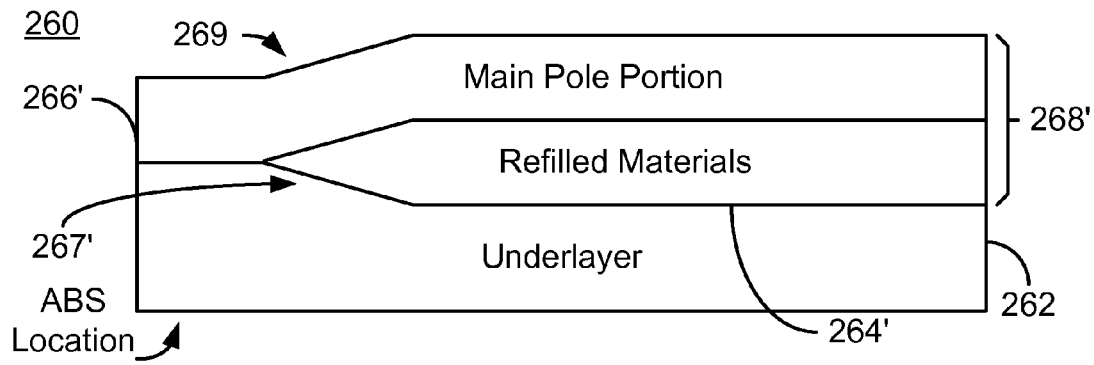

FIG. 18 is a flow chart depicting an exemplary embodiment of a method 250 for fabricating a pole having a bevel in a magnetic recording transducer. FIGS. 19-21 are diagrams depicting side views an exemplary embodiment of a magnetic recording transducer 260 during fabrication. The transducer 260 may be part of a magnetic recording head that may also include a read transducer (not shown) and reside on the slider for a disk drive. The method 250 is described in the context of the magnetic recording transducer 260. The magnetic recording transducer 260 corresponds to the magnetic recording transducer 200/200'. Consequently, although not shown, the magnetic recording transducer 260 includes side shields. Referring to FIGS. 18-21, in the method 250, some steps may be omitted or combined. In addition, for clarity, FIGS. 19-21 are not drawn to scale. The method 250 is also described in the context of providing a single recording transducer. However, the method 250 may be used to fabricate multiple transducers at substantially the same time. The method 250 and transducer 260 are also described in the context of particular layers. A particular layer may include multiple materials and/or multiple sublayers. The method 250 may be incorporated into the methods 100 and 120.

A portion of the underlayer distal from the ABS location is removed, via step 252. Step 252 may be performed prior to the step 102 or 122 of the methods 100 and 120, respectively. FIG. 19 depicts the magnetic transducer 260 after step 252 is performed. Thus, the underlayer 262 is shown. Also shown is trench 263. The trench 263 is refilled with magnetic material(s) for the pole, via step 254. Step 254 may be performed as part of step 112 or 138. In one embodiment, the trench 263 is refilled only to its top. However, in another embodiment, the trench 263 may be overfilled. In such an embodiment, a top bevel may also be provided. The remaining portion of the pole material(s) is provided, via step 256. In one embodiment, step 254 and step 256 may be merged. FIG. 20 depicts the magnetic transducer 260 after step 256 is performed. In the embodiment shown in FIG. 20, the pole material(s) 264 used to refill the trench 263 are provided to the top of the trench 263. The remaining pole materials 266 reside on the refilled materials 264. Consequently, pole 268 having only a bottom bevel 269 is provided. FIG. 21 depicts another embodiment of the magnetic transducer 260 in which the magnetic materials 264' used to refill the trench 263 extend above the top of the trench 263. As a result, in addition to the bevel 267', a top bevel 269 is formed in the main pole materials 266' of the pole 268'. Thus, a bottom bevel 267 only or a combination of a bottom 267' and a top bevel 269 may be provided.

Thus, in addition to the benefits achievable using the methods 100 and 120, bevel(s) may also be provided using the method 260. Consequently, high-density performance of the magnetic transducer may be improved.

Figure 22:
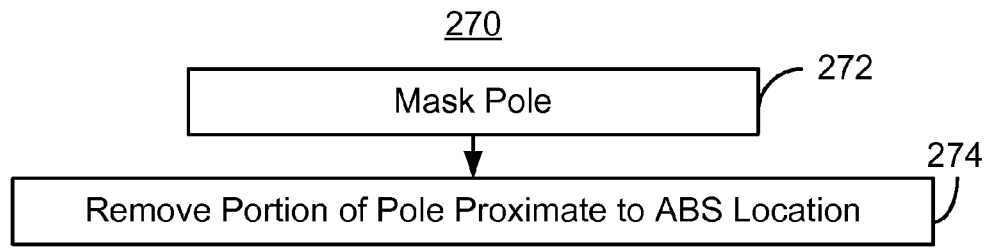
FIG. 22 is a flow chart depicting an exemplary embodiment of a method for fabricating a pole having a bevel in a magnetic recording transducer.
Figure 23:
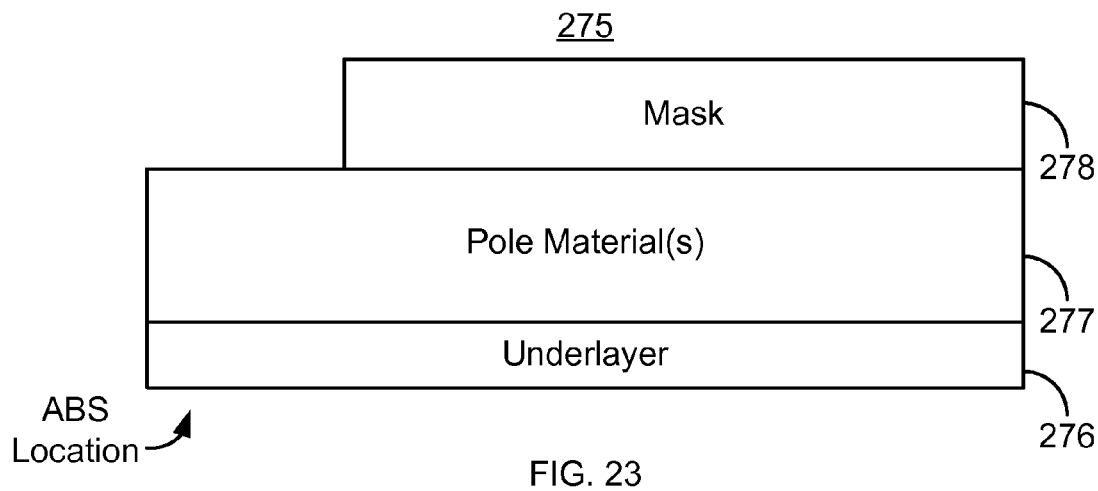
FIGS. 23-24 are diagrams depicting an exemplary embodiment of a magnetic recording transducer during fabrication.
Figure 24:
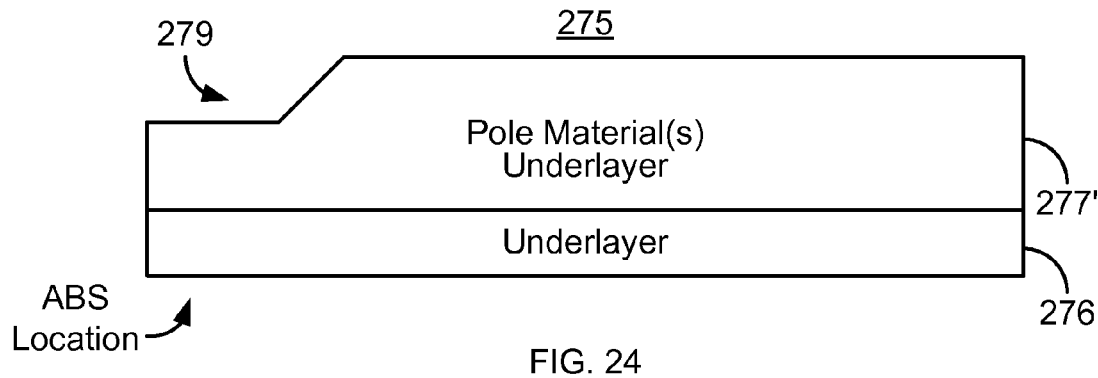

FIG. 22 is a flow chart depicting an exemplary embodiment of a method 270 for fabricating a pole having a bevel in a magnetic recording transducer. FIGS. 23-24 are diagrams depicting side views an exemplary embodiment of a magnetic recording transducer 275 during fabrication. The transducer 275 may be part of a magnetic recording head that may also include a read transducer (not shown) and reside on the slider for a disk drive. The magnetic recording transducer 275 corresponds to the magnetic recording transducer 200/200'. Consequently, although not shown, the magnetic recording transducer 275 includes side shields. The method 270 is described in the context of the magnetic recording transducer 275. Referring to FIGS. 22-24, in the method 270, some steps may be omitted or combined. In addition, for clarity, FIGS. 23-24 are not drawn to scale. The method 270 is also described in the context of providing a single recording transducer. However, the method 270 may be used to fabricate multiple transducers at substantially the same time. The method 270 and transducer 275 are also described in the context of particular layers. A particular layer may include multiple materials and/or multiple sublayers. The method 270 may be incorporated into the methods 100 and 120. In particular, the method 270 may be used after the pole material(s) are provided in step 112 and 138.

A portion of the pole material(s) distal from the ABS location is masked, via step 272. FIG. 23 depicts the magnetic transducer 275 after step 272 is performed. Thus, pole material(s) 277 residing on an underlayer 276 are shown. In addition, a mask 278 is shown. The exposed portion of the pole material(s) 277 is removed, via step 274. In addition, the mask 278 may be removed. FIG. 24 depicts the magnetic transducer 275 after step 274 is performed. Consequently, a top bevel 279 has been formed in the pole material(s) 277'.

Thus, in addition to the benefits achievable using the methods 100 and 120, a bevel 279 may also be provided using the method 270. Consequently, high-density performance of the magnetic transducer may be improved.

Figure 25:
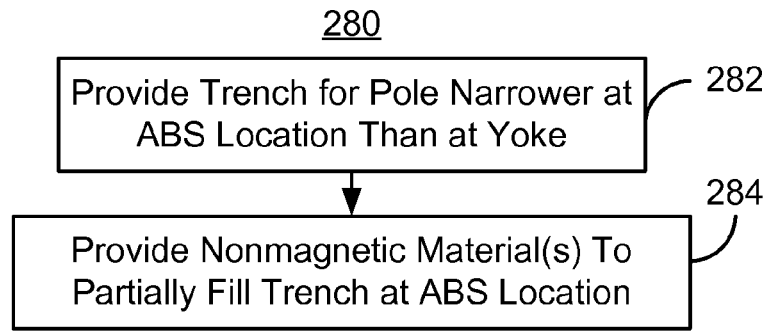
FIG. 25 is a flow chart depicting an exemplary embodiment of a method for fabricating a pole having a bevel in a magnetic recording transducer.
Figure 26:
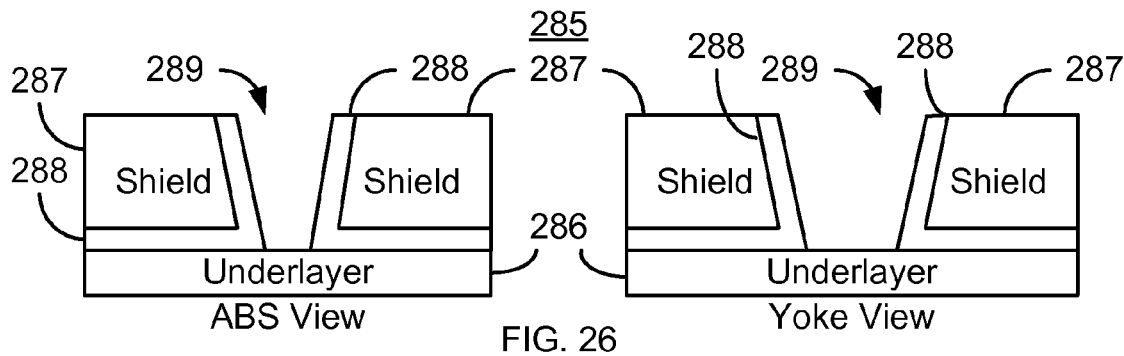
FIGS. 26-28 are diagrams depicting an exemplary embodiment of a magnetic recording transducer during fabrication.
Figure 27:
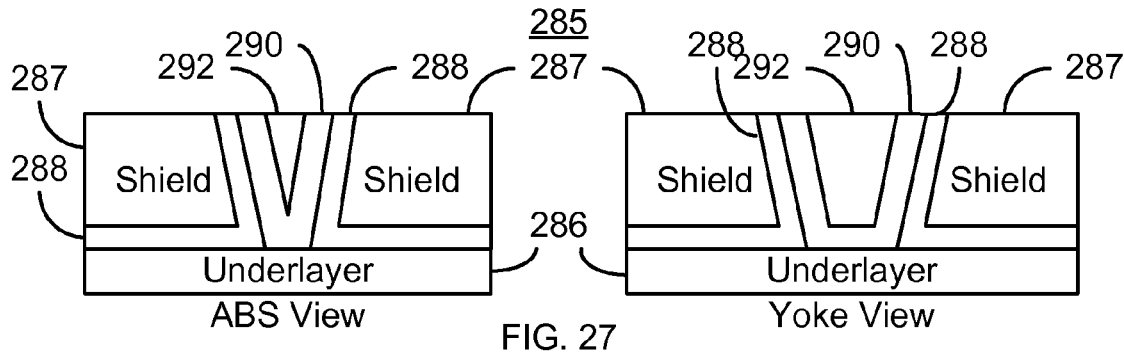
Figure 28:
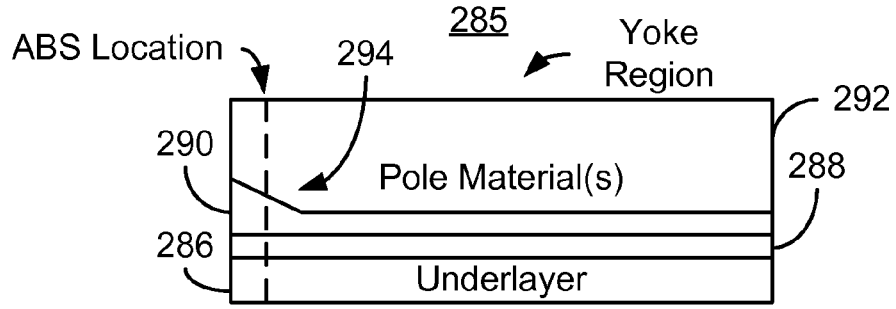

FIG. 25 is a flow chart depicting an exemplary embodiment of a method 280 for fabricating a pole having a bevel in a magnetic recording transducer. FIGS. 26-28 are diagrams depicting an exemplary embodiment of a magnetic recording transducer 285 during fabrication. The transducer 285 may be part of a magnetic recording head that may also include a read transducer (not shown) and reside on the slider for a disk drive. The magnetic recording transducer 285 corresponds to the magnetic recording transducer 200/200'. The method 280 is described in the context of the magnetic recording transducer 285. Referring to FIGS. 25-28, in the method 280, some steps may be omitted or combined. In addition, for clarity, FIGS. 26-28 are not drawn to scale. The method 280 is also described in the context of providing a single recording transducer. However, the method 280 may be used to fabricate multiple transducers at substantially the same time. The method 280 and transducer 285 are also described in the context of particular layers. A particular layer may include multiple materials and/or multiple sublayers. The method 280 may be incorporated into the methods 100 and 120 to provide a beveled pole.

The trench in the nonmagnetic layer is formed such that the trench is narrower in proximity to the ABS location, via step 282. Using step 282, trench formed in steps 102-110 and/or in steps 122-134 may have a profile that is narrower near the pole tip, and wider near a yoke portion of the pole. Step 282 may be performed by forming the negative mask having the desired profile. As a result, the trench formed between the portions of the nonmagnetic layers on the sides of the negative mask has the desired profile. FIG. 26 depicts ABS location and yoke region views of the magnetic transducer 285 after step 282 is performed. Thus, underlayer 286 and nonmagnetic layer 288 are shown. Also shown are side shields 287 formed during fabrication of the magnetic transducer 285. The trench 289 resides between portions of the nonmagnetic layer 288. As can be seen in FIG. 26, the trench 289 is narrower in the track width direction in proximity to the ABS location than distal from the ABS location, at the yoke region.

As described above with respect to the methods 100 and 120, during formation of the pole, additional nonmagnetic material(s) may be provided. These material(s) may include additional insulating layers and/or planarization stop layers. Consequently, such nonmagnetic material(s) are provided at a thickness sufficient to fill a bottom portion of the trench 289 in proximity to the ABS, via step 284. In step 284, therefore, deposition of the nonmagnetic material(s) of steps 112 and/or 136 is continued in until the material on the sides of the trench 289 grows together to fill a bottom portion of the trench 289 in proximity to the ABS location. However, the bottom of the trench 289 in the yoke region is not completely filled. In other words, the nonmagnetic material(s) at the bottom of the trench 289 are thicker proximate to the ABS location than distal from the ABS location. Fabrication of the magnetic transducer may then be continued, for example by providing the pole material(s) in step 112 and/or step 138.

FIGS. 27-28 depict the magnetic transducer 285 after step 284 is completed and magnetic material(s) for the pole have been deposited. FIG. 27 depicts ABS and yoke views of the magnetic transducer 285. FIG. 28 depicts a side view of the magnetic transducer 285. Thus, nonmagnetic material(s) 290 and pole material(s) 292 have been provided. As can be seen in FIGS. 27-28, because the nonmagnetic materials have grown together, the nonmagnetic material(s) are thicker at the bottom of the trench near the ABS location. For the magnetic recording transducer 285, profile of the trench 289 changes diameter smoothly. For example, in one embodiment, the diameter of the trench 289 may increase linearly from the ABS region to the yoke region, and then remain constant. However, in another embodiment, the diameter of the trench may increase in another manner. Because of the change in diameter, the thickness of the nonmagnetic material(s) 290 at the bottom of the trench 289 changes. As a result, a bevel 294 may be formed.

Thus, in addition to the benefits achievable using the methods 100 and 120, a bevel 294 may also be provided using the method 280. Consequently, high-density performance of the magnetic transducer may be improved.

Figure 29:
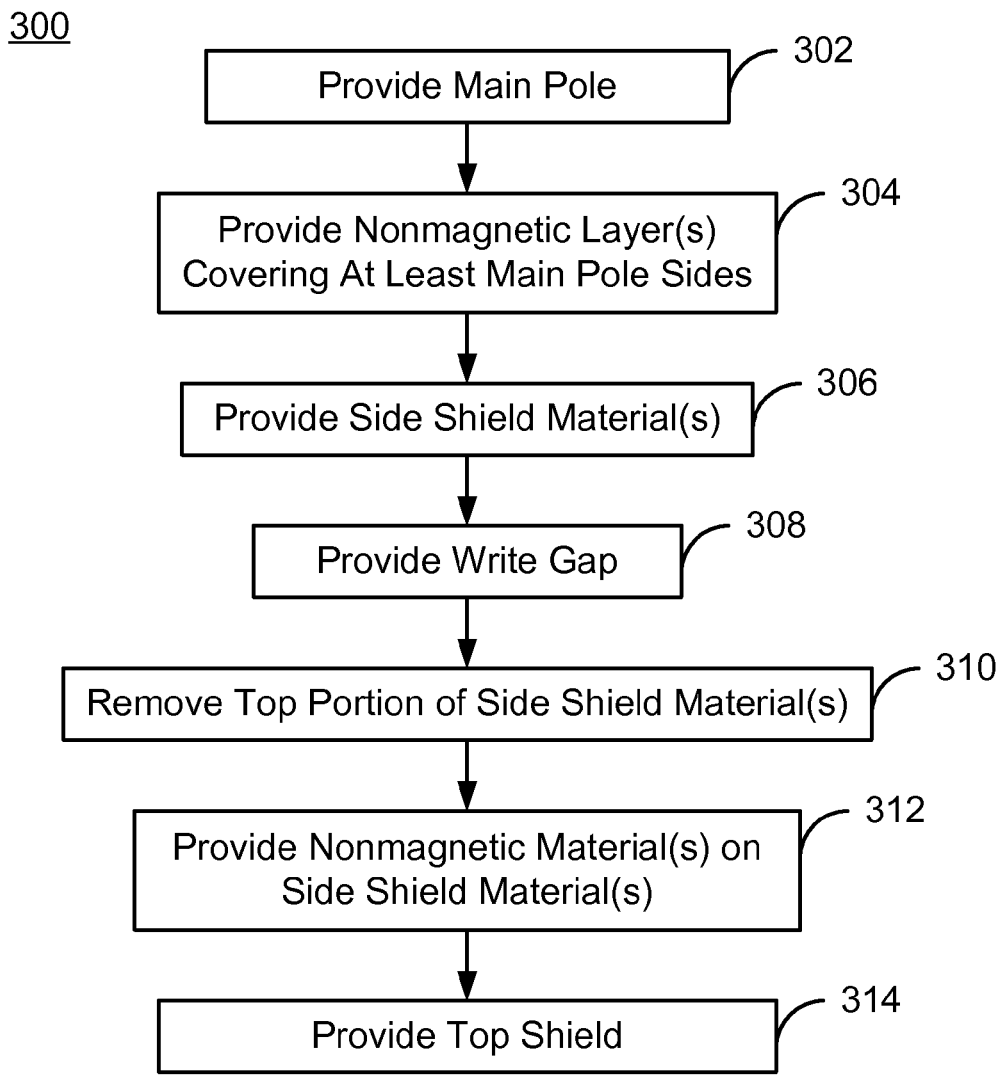
FIG. 29 is a flow chart depicting an exemplary embodiment of a method for fabricating top shields in a magnetic recording transducer.

FIG. 29 is a flow chart depicting an exemplary embodiment of a method 300 for fabricating top shields in a magnetic recording transducer. FIGS. 30-33 are diagrams depicting an exemplary embodiment of a magnetic recording transducer 350 during fabrication. The transducer 350 may be part of a magnetic recording head that may also include a read transducer (not shown) and reside on the slider for a disk drive. The magnetic recording transducer 350 may correspond to the magnetic recording transducer 200/200'. The method 300 may, therefore, be used in performing the step 114 and/or 144 of the method 100 and/or 120, respectively. However, in another embodiment, the method 300 may be used on a magnetic transducer having side shields formed using a method other than the methods 100 and 120. In addition, the method 300 may, but need not, incorporate the methods 250, 270, and/or 280 for forming a bevel. The method 300 is described in the context of the magnetic recording transducer 350. Referring to FIGS. 29-33, in the method 300, some steps may be omitted or combined. In addition, for clarity, FIGS. 30-33 are not drawn to scale. The method 300 is also described in the context of providing a single recording transducer. However, the method 300 may be used to fabricate multiple transducers at substantially the same time. The method 300 and transducer 350 are also described in the context of particular layers. A particular layer may include multiple materials and/or multiple sublayers.

A main pole is provided, via step 302. In one embodiment, the main pole is a PMR pole having a bottom, a plurality of sides, and a top wider than the bottom. In addition, a nonmagnetic layer that covers at least the sides of the main pole is provided, via step 304. The nonmagnetic layer(s) provided in step 304 may correspond to the nonmagnetic layer provided in steps 104 and 128 of the methods 100 and 120, respectively. Step 304 may also provide nonmagnetic layer(s) that correspond to track width adjustment, seed, planarization stop and/or other nonmagnetic layers that might be provided in steps 112 and 136 of the methods 100 and 120, respectively.

Side shield material(s) are provided, via step 306. Step 306 might correspond to steps 108 and 132, respectively. Thus, at least a portion of the nonmagnetic layer(s) reside between the pole and the side shield material(s). A write gap may also be provided in step 308. In an alternate embodiment, the write gap may be provided later. Therefore, steps 302-308 may correspond to steps 102-114 and steps 122-142 of the methods 100 and 120, respectively. However, in another embodiment, the pole, nonmagnetic layer(s), side shield(s) and write gap may be provided in another manner.

Figure 30:
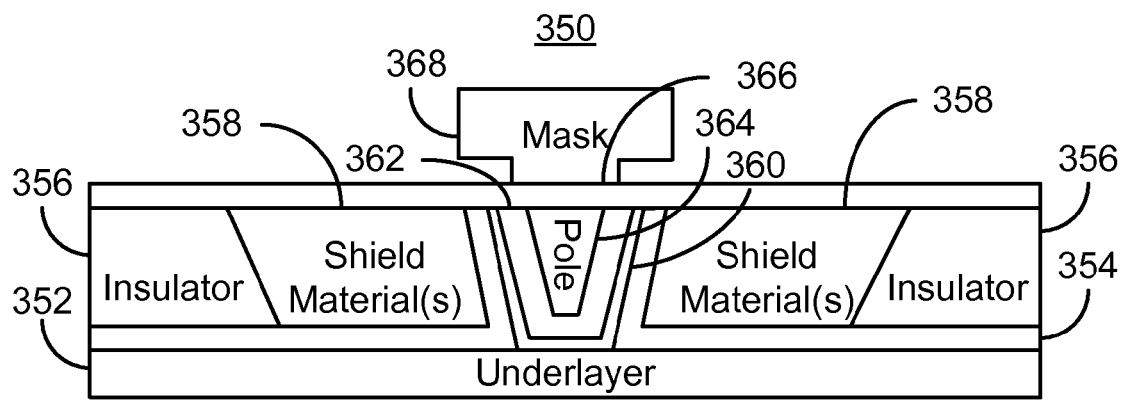
FIGS. 30-33 are diagrams depicting an exemplary embodiment of a magnetic recording transducer during fabrication.
Figure 31:
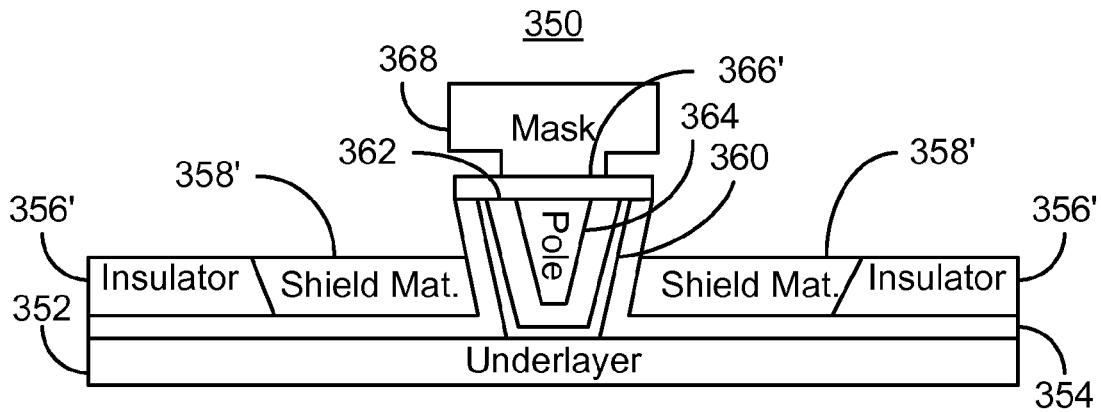

A top portion of the side shield material(s) is removed, via step 310. Step 310 may include providing a mask that covers the pole, then milling the side shield material(s). FIG. 30 depicts the magnetic recording transducer 350 after such a mask has been provided in step 310. Thus, the magnetic recording transducer 350 includes an underlayer 352, insulator 356, side shields including side shield material(s) 358, nonmagnetic layers 354, 360, and 362, pole 364, and write gap layer 366. Thus, in the embodiment shown, the nonmagnetic layers provided in step 304 include the nonmagnetic layer provided in steps 104 and 128 of the methods 100 and 120, respectively, an optional track width adjustment layer 360, and planarization stop layer 362 that may be provided in steps 112 and 136 of the methods 100 and 120, respectively. However, in another embodiment, different and/or additional nonmagnetic layers may be provided. Also shown is a mask 368 that covers the pole 364. After the mask is provided, a top portion of the side shield material(s) 358 is removed, also in step 310. In one embodiment, this portion of step 310 includes ion milling the side shield material(s) 358. This milling may be performed at an angle. In addition, part of the write gap layer 366 may be removed. FIG. 31 depicts the magnetic transducer 350 after step 310 has been completed. Thus, a portion of the write gap layer has been removed, leaving the write gap 366'. Portions of the side shield material(s) 358 and insulator 356 have been removed, leaving side shield material(s) 358' and insulator 356'.

Figure 32:
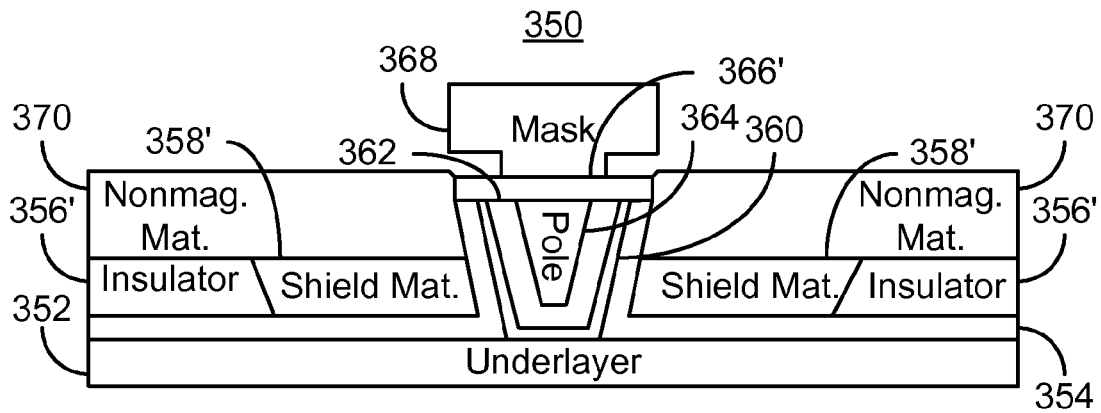

Nonmagnetic material(s) are provided on the remaining portion of the side shield material(s), via step 312. In one embodiment, step 312 includes refilling the region above the shield material(s) 358' and insulator 356' with an insulator such as aluminum oxide. However, in another embodiment, other and/or additional material(s) may be used. FIG. 32 depicts the magnetic transducer 350 after step 312 is completed. Thus, nonmagnetic material(s) 370 have been provided. As can be seen in FIG. 32, the nonmagnetic material(s) 370 cover the side shield material(s) 358'.

Figure 33:
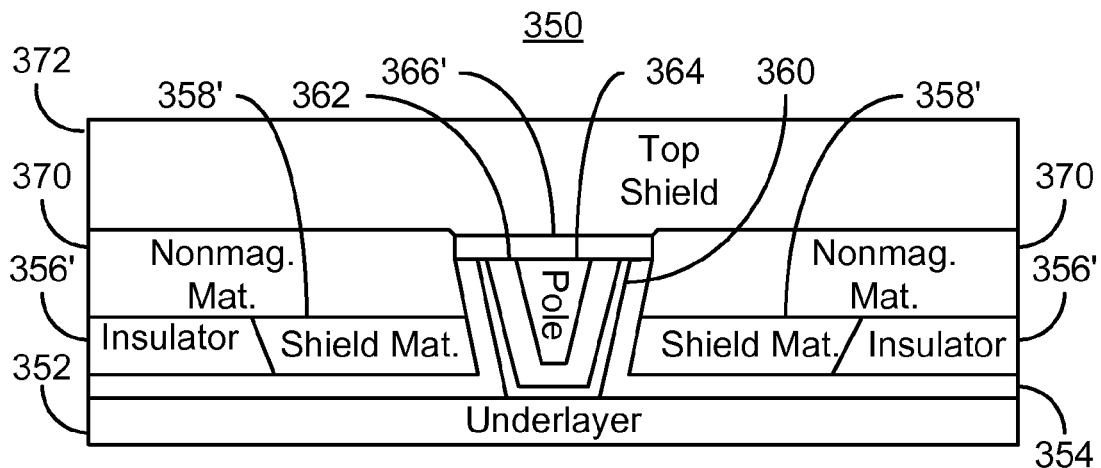

A top shield is provided, via step 314. In one embodiment, step 314 includes removing the mask 368. In addition, magnetic material(s) for the top shield are provided. The top shield might include material(s) such as NiFe and/or CoNiFe. FIG. 33 depicts the magnetic transducer 350 after step 314 is completed. Thus, a top shield 372 is shown. The nonmagnetic material(s) 370 physically separate the shield material(s) 358' from the top shield 372.

Thus, using the method 300, the benefits of the methods 100, 120, 250, 270, and 280 might be achieved. For example, the advantages of a side shield may be obtained. In addition, the pole 364 may be beveled, thereby providing the advantages of a beveled pole. Further, the side shields 358' reside primarily at the bottom edge of the pole 364. Consequently, the side fields may be more greatly reduced at the leading edge, which is desirable. Further, losses in field at the trailing edge of the transducer 350 (e.g. near the top of the pole 364) due to the side shields 358' may be reduced. Consequently, performance of the transducer 350 may be improved.

Figure 34:
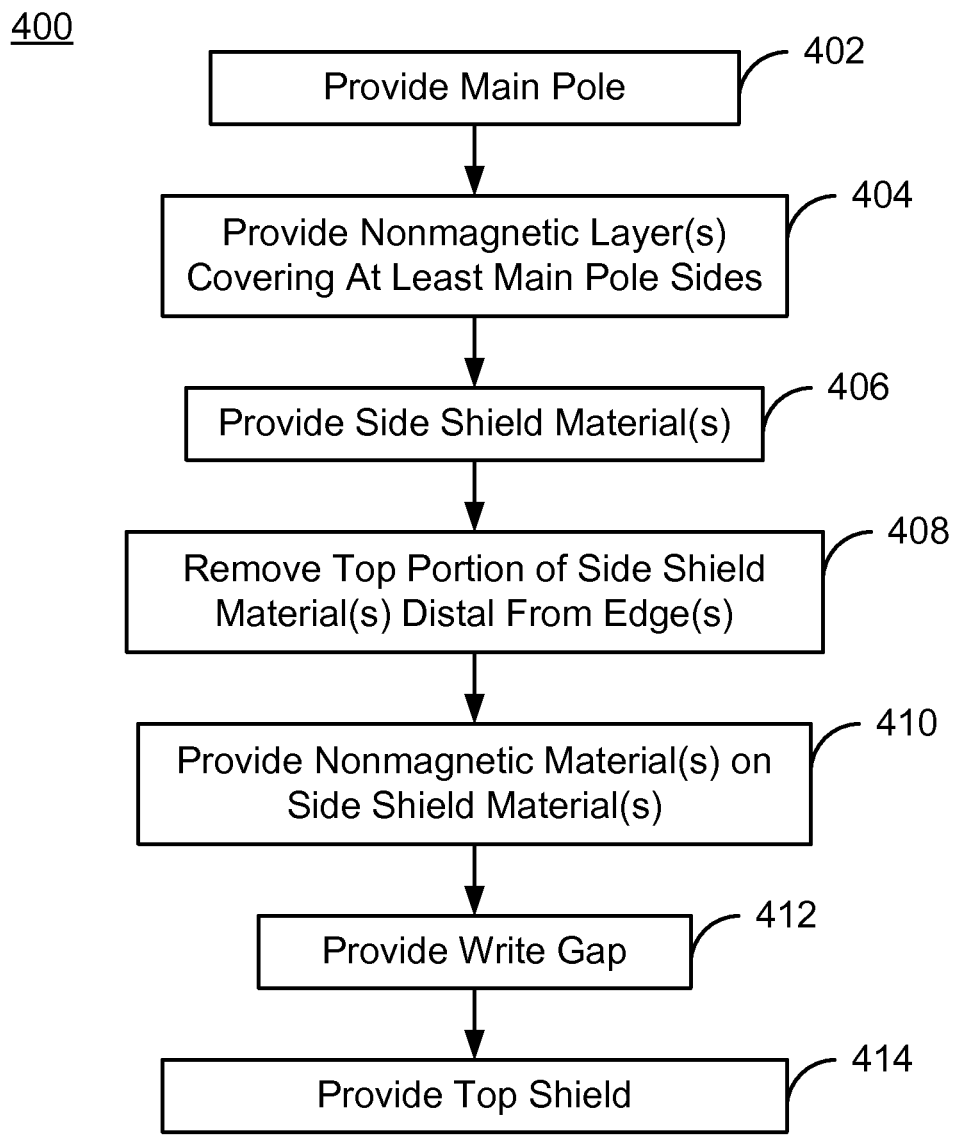
FIG. 34 is a flow chart depicting an exemplary embodiment of a method for fabricating top shields in a magnetic recording transducer.

FIG. 34 is a flow chart depicting an exemplary embodiment of a method 400 for fabricating top shields in a magnetic recording transducer. FIGS. 35-39 are diagrams depicting an exemplary embodiment of a magnetic recording transducer 450 during fabrication. The method 400 is described in the context of the magnetic recording transducer 450. Referring to FIGS. 34-39, the transducer 450 may be part of a magnetic recording head that may also include a read transducer (not shown) and reside on the slider for a disk drive. The magnetic recording transducer 450 may correspond to the magnetic recording transducer 200/200'. The method 400 may, therefore, be used in performing the step 114 and/or 144. However, in another embodiment, the method 400 may be used on a magnetic transducer having side shields formed using a method other than the methods 100 and 120. In addition, the method 400 may, but need not, incorporate the methods 250, 270, and/or 280 for forming a bevel. In the method 400, some steps may be omitted or combined. In addition, for clarity, FIGS. 35-39 are not drawn to scale. The method 400 is also described in the context of providing a single recording transducer. However, the method 400 may be used to fabricate multiple transducers at substantially the same time. The method 400 and transducer 450 are also described in the context of particular layers. A particular layer may include multiple materials and/or multiple sublayers.

A main pole is provided, via step 402. In one embodiment, the main pole is a PMR pole having a bottom, a plurality of sides, and a top wider than the bottom. In addition, nonmagnetic material(s) that cover at least the sides of the main pole are provided, via step 404. The nonmagnetic layer(s) provided in step 404 may correspond to the nonmagnetic layer provided in steps 104 and 128 of the methods 100 and 120, respectively. Step 404 may also provide nonmagnetic layer(s) that correspond to track width adjustment, seed, planarization stop and/or other nonmagnetic layers that might be provided in steps 112 and 136 of the methods 100 and 120, respectively. Side shield material(s) are provided, via step 406. Step 406 might correspond to steps 108 and 132, respectively. Thus, at least a portion of the nonmagnetic layer(s) reside between the pole and the side shield material(s). In one embodiment, therefore, steps 402-406 may correspond to steps 102-112 and steps 122-140 of the methods 100 and 20, respectively. However, in another embodiment, the pole, nonmagnetic layer(s), side shield(s) and write gap may be provided in another manner.

Figure 35:
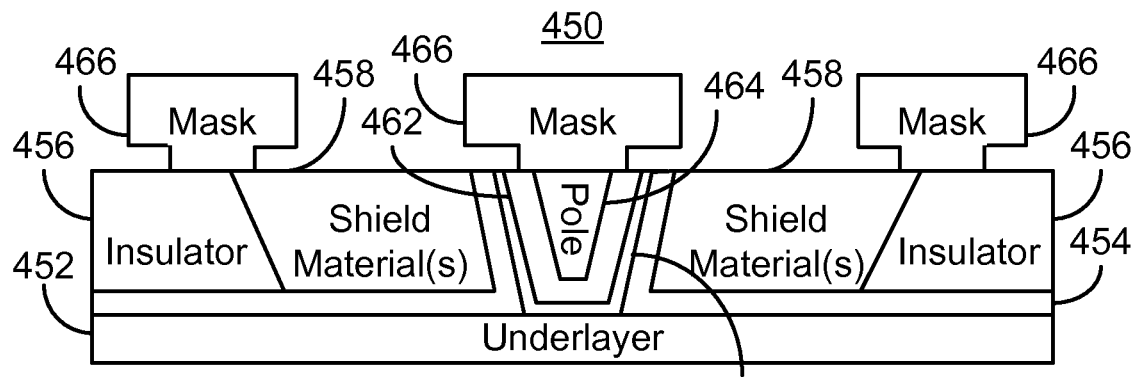
FIGS. 35-39 are diagrams depicting an exemplary embodiment of a magnetic recording transducer during fabrication.
Figure 36:
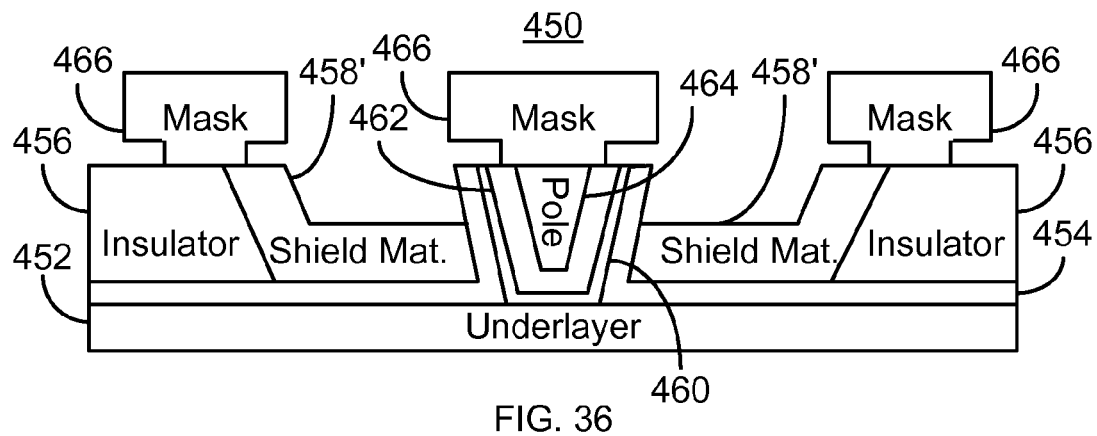

A portion of the top of the side shield material(s) is removed, via step 408. The portion that is removed in step 408 is distal from the edges of the side shield material(s). Step 408 may include providing a mask that covers the pole and edges of the side shield material(s), then milling the side shield material(s). FIG. 35 depicts the magnetic recording transducer 450 after such a mask has been provided in step 408. Thus, the magnetic recording transducer 450 includes an underlayer 452, insulator 456, side shields including side shield material(s) 458, nonmagnetic layers 454, 460, and 462, and pole 464. Thus, in the embodiment shown, the nonmagnetic layers provided in step 404 include the nonmagnetic layer provided in steps 104 and 128 of the methods 100 and 120, respectively, an optional track width adjustment layer 460, and planarization stop layer 462 that may be provided in steps 112 and 136 of the methods 100 and 120, respectively. However, in another embodiment, different and/or additional nonmagnetic layers may be provided. Also shown is a mask 466 that covers the pole 464 and edges of the side shield materials 458. After the mask is provided, a top portion of the side shield material(s) 458 distal from the side shield material(s) edges is removed. In one embodiment, this portion of step 408 includes ion milling the side shield material(s) 458. This milling may be performed at an angle. FIG. 36 depicts the magnetic transducer 450 after step 408 has been completed. Portions of the side shield material(s) 458 have been removed, leaving side shield material(s) 458'.

Figure 37:
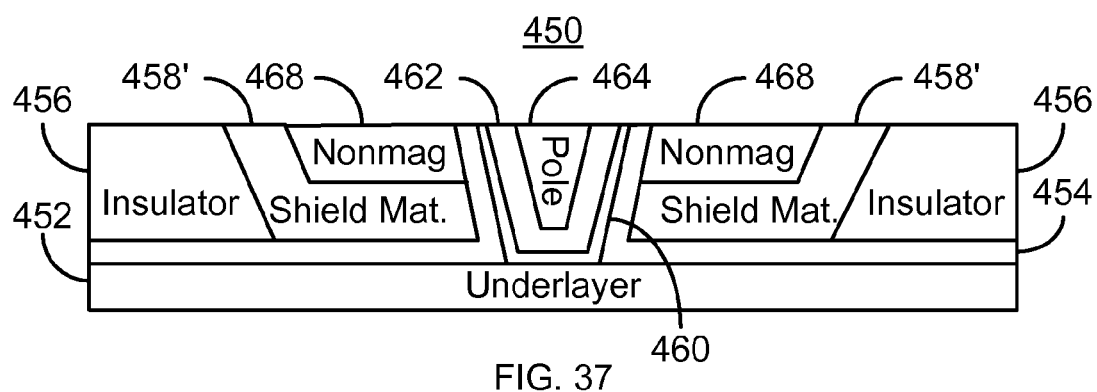

Nonmagnetic material(s) are provided on the remaining portion of the side shield material(s) 458', via step 410. In one embodiment, step 410 includes refilling the region above the shield material(s) 458' with an insulator such as aluminum oxide. However, in another embodiment, other and/or additional material(s) may be used. FIG. 37 depicts the magnetic transducer 450 after step 410 is completed. Thus, nonmagnetic material(s) 468 have been provided. As can be seen in FIG. 37, the nonmagnetic material(s) 468 cover only a portion of the side shield material(s) 458'. A portion of the side shield material(s) 458' at its edges remain exposed.

Figure 38:
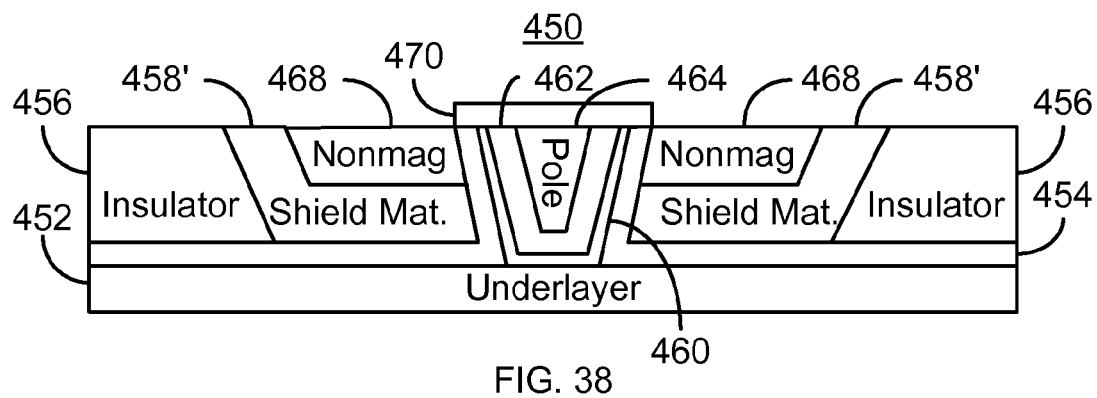

A write gap is provided, via step 412. FIG. 38 depicts the magnetic transducer 450 after step 412 is performed. Consequently, a write gap 470 has been provided.

Figure 39:
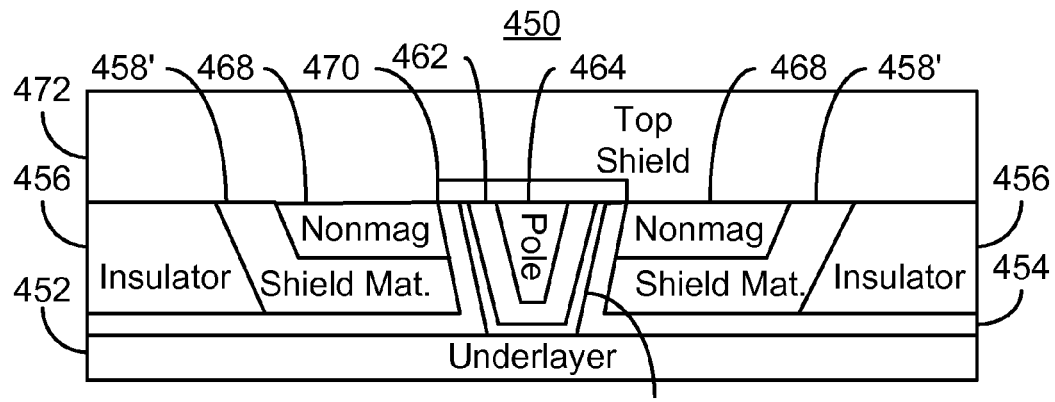

A top shield is provided, via step 414. In one embodiment, magnetic material(s) for the top shield are deposited, for example through plating. The top shield might include material(s) such as NiFe. FIG. 39 depicts the magnetic transducer 450 after step 414 is completed. Thus, a top shield 472 is shown. The nonmagnetic material(s) 468 physically separate only a portion of the shield material(s) 458' from the top shield 472.

Thus, using the method 400, the benefits of the methods 100, 120, 250, 270 and/or 280 might be achieved. For example, the advantages of a side shield may be obtained. In addition, the pole 464 may be beveled, thereby providing the advantages of a beveled pole. Further, the side shields 458' reside primarily at the bottom edge of the pole 464. Consequently, the side fields may be more greatly reduced at the leading edge, which is desirable. Further, losses in field at the trailing edge of the transducer 450 (e.g. near the top of the pole 464) due to the side shields 458' may be reduced. Consequently, performance of the transducer 450 may be improved.

Figure 40:
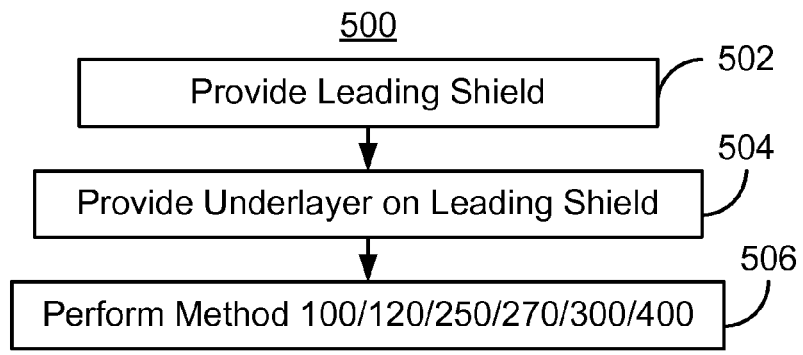
FIG. 40 is a flow chart depicting an exemplary embodiment of a method for fabricating a leading shield in a magnetic recording transducer.
Figure 41:
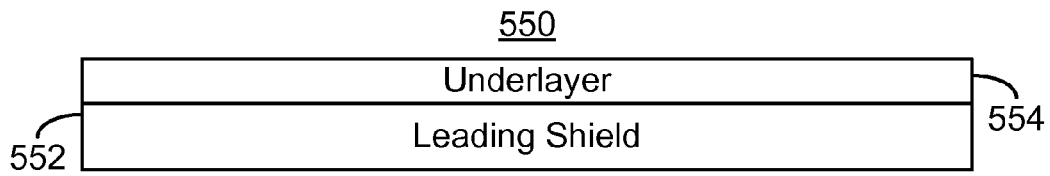
FIGS. 41-42 are diagrams depicting an exemplary embodiment of a magnetic recording transducer during fabrication.
Figure 42:
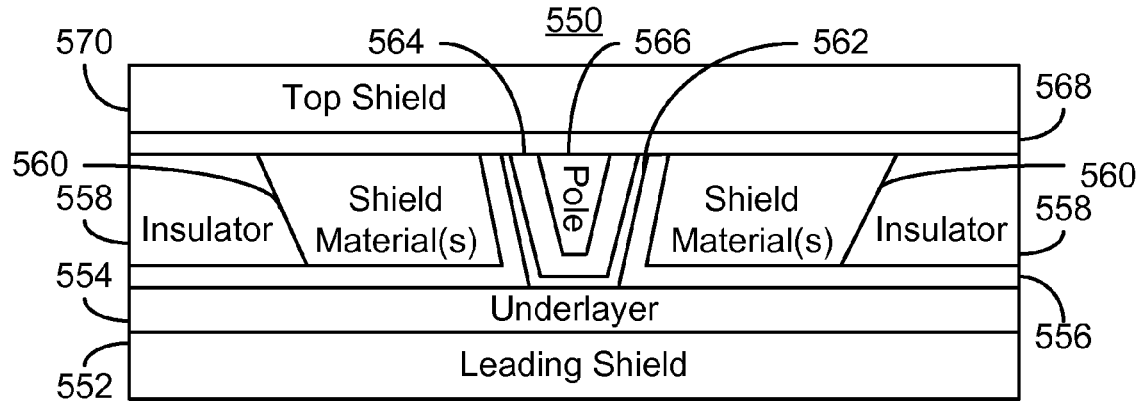

FIG. 40 is a flow chart depicting an exemplary embodiment of a method 500 for fabricating a leading shield in a magnetic recording transducer. FIGS. 41-42 are diagrams depicting an exemplary embodiment of a magnetic recording transducer 550 during fabrication. The method 500 is described in the context of the magnetic recording transducer 550. Referring to FIGS. 40-42, the transducer 550 may be part of a magnetic recording head that may also include a read transducer (not shown) and reside on the slider for a disk drive. The magnetic recording transducer 550 may correspond to the magnetic recording transducer 200/200'/350/450. The method 500 may, therefore, be used in performing the step 114 and/or 144. However, in another embodiment, the method 500 may be used on a magnetic transducer having side shields formed using a method other than the methods 100 and 120. In addition, the method 500 may, but need not, incorporate the methods 250, 270, and/or 280 for forming a bevel. In the method 500, some steps may be omitted or combined. In addition, for clarity, FIGS. 41-42 are not drawn to scale. The method 500 is also described in the context of providing a single recording transducer. However, the method 500 may be used to fabricate multiple transducers at substantially the same time. The method 500 and transducer 550 are also described in the context of particular layers. A particular layer may include multiple materials and/or multiple sublayers.

A leading shield is deposited on the magnetic transducer 550, via step 502. Step 502 may be performed by plating a magnetic material on the magnetic transducer 550. The underlayer is provided on the leading shield, via step 504. Step 504 may include depositing an insulator, such as aluminum oxide. FIG. 41 depicts the magnetic transducer 550 after step 504 is performed. Thus, the leading shield 552 and underlayer 554 are shown.

The remainder of the magnetic transducer is fabricated using one or more of the methods 100, 120, 250, 270, 300, and/or 400, via step 506. Consequently, a main pole, side shields, write gap, and top pole may be fabricated. FIG. 42 depicts one embodiment of the magnetic transducer 550. In the embodiment shown, the magnetic transducer 550 also includes a nonmagnetic layer 556, insulator 558, side shield material(s) 560, optional track width adjustment layer 562, planarization stop layer 564, main pole 566, write gap 568, and top shield 570. However, in other embodiments, portions of the magnetic transducer 550 may differ. For example, the write gap 568 might not completely cover the side shield material(s) 560. Thus, the top shield 570 may not float. For example, top shields may be provided using the method 300, 400. In addition, one or more bevels may be provided in the pole 566.

Thus, using the method 500, the benefits of the methods 100, 120, 250, 270, 280, 300, and/or 400 might be achieved. For example, the advantages of a side shield and beveled poles may be obtained. Further, losses in field at the trailing edge of the transducer 550 (e.g. near the top of the pole 564) due to the side shields 560 may be reduced if the methods 300 and/or 400 are used. Further, stray fields may be further reduced by the leading shield 552. Consequently, performance of the transducer 550 may be improved.

We claim:

1. A method for manufacturing a magnetic transducer comprising:
   providing a negative mask having a plurality of sides, a top, and a bottom, the top being wider than the bottom;
   providing a nonmagnetic layer on the negative mask, the nonmagnetic layer having a plurality of portions covering the plurality of sides of the negative mask;
   providing a first mask having a first trench therein, the negative mask residing in the first trench;
   providing at least one side shield material, at least a portion of the at least one side shield material residing in the first trench;
   removing the negative mask to provide a second trench between the plurality of portions of the nonmagnetic layer; and
   providing a pole, at least a portion of the pole residing in the second trench.

2. The method of claim 1 wherein the step of providing the negative mask further includes:
   providing an sacrificial mask having a mask trench therein;
   depositing at least one sacrificial material in the mask trench, the at least one sacrificial material corresponding to the negative mask; and
   removing the sacrificial mask.

3. The method of claim 2 wherein the step of depositing the at least one sacrificial material further includes:
   plating the at least one sacrificial material.

4. The method of claim 1 wherein the step of providing the pole further includes:
   depositing at least one nonmagnetic material, a portion of the at least one nonmagnetic material residing in the second trench;
   depositing at least one pole material, at least a portion of the at least one pole material residing on the portion of the nonmagnetic material in the second trench; and
   planarizing the at least one pole material.

5. The method of claim 4 wherein the step of depositing the at least one nonmagnetic material further includes:
   providing a track width adjustment layer using atomic layer deposition.

6. The method of claim 5 wherein the step of depositing the at least one nonmagnetic material further includes:
   depositing a planarization stop layer.

7. The method of claim 4 wherein the magnetic transducer includes an air-bearing surface (ABS) location, and wherein the step of depositing the at least one nonmagnetic material further includes:
   continuing deposition of the at least one nonmagnetic material such that a pole portion of the at least one nonmagnetic material proximate to the ABS location is thicker than a yoke portion of the at least one nonmagnetic material distal from the ABS location.

8. The method of claim 1 further comprising:
   providing a write gap, at least a portion of the write gap covering the pole; and
   providing a top shield, at least a portion of the top shield residing on the write gap.

9. The method of claim 8 wherein the step of providing the write gap further includes:
   depositing a write gap material, the write gap material covering the pole and at least a first portion of the at least one side shield material;
   removing a portion of the write gap material to expose at least a second portion of the at least one side shield material.

10. The method of claim 9 wherein the step of providing the top shield, further comprising:
    depositing at least one top shield material such that a portion of the at least one top shield material directly contacts the second portion of the at least one side shield material.

11. The method of claim 8 wherein the at least one side shield material includes a top and wherein the step of providing the top shield, further comprising:
    removing a top portion of the at least one side shield material;
    providing a nonmagnetic material on a remaining portion of the at least one side shield material, the nonmagnetic material physically separating the remaining portion of the at least one side shield material from the top shield.

12. The method of claim 8 wherein the at least one side shield material includes a top and at least one edge, and wherein step of providing the top shield, further comprising:
    removing a portion of the top of the at least one side shield material distal from the at least one edge;
    providing a nonmagnetic material on a remaining portion of the at least one side shield material, the at least one edge of the at least one side shield material being exposed such that the at least one edge contacts the top shield at the at least one edge.

13. The method of claim 1 wherein the step of providing the pole, further comprising:
   providing at least one of a top bevel and a bottom bevel for the pole.

14. The method of claim 1 further comprising:
   providing a leading shield.

15. The method of claim 1 wherein the first trench has a first trench bottom and a first trench top wider than the first trench bottom.

16. A method for providing a magnetic transducer comprising:
   providing a first mask having a trench therein, the trench having a bottom and a top wider than the bottom;
   depositing at least one sacrificial material in the trench, the at least one sacrificial material having a plurality of sides;
   removing the first mask;
   providing a nonmagnetic layer, the nonmagnetic layer having a plurality of sides covering the plurality of sides of the at least one sacrificial material;
   providing a second mask having a second trench, the at least one sacrificial material residing in the second trench, the second trench having a second trench bottom and a second trench top wider than the second trench bottom;
   providing at least one side shield material, at least a portion of the at least one side shield material residing in the second trench;
   removing the at least one sacrificial material to provide a third trench between the at least one side of the nonmagnetic layer;
   providing a pole, at least a portion of the pole residing in the third trench;
   providing a write gap, at least a portion of the write gap covering the pole; and
   providing a top shield, at least a portion of the top shield residing on the write gap.

* * * * *